United States Patent
Sasaki et al.

[11] Patent Number: 5,886,836
[45] Date of Patent: Mar. 23, 1999

[54] LENS BARREL HAVING A CAM MECHANISM

[75] Inventors: Takamitsu Sasaki; Zenichi Okura, both of Tokyo, Japan

[73] Assignee: Asahi Kogaku Kogyo Kabushiki Kaisha, Tokyo, Japan

[21] Appl. No.: 955,155

[22] Filed: Oct. 21, 1997

[30] Foreign Application Priority Data

Oct. 31, 1996 [JP] Japan .................................. 8-290411

[51] Int. Cl.⁶ .............................. G02B 7/02; G02B 15/14
[52] U.S. Cl. ......................... 359/823; 359/700; 359/701; 396/72
[58] Field of Search ..................................... 359/819, 823, 359/694, 699, 700, 701, 703; 396/72, 85

[56] References Cited

U.S. PATENT DOCUMENTS

| | | | |
|---|---|---|---|
| 4,707,083 | 11/1987 | Iizuka et al. | 359/700 |
| 4,948,227 | 8/1990 | Takeyasu | 359/823 |
| 5,161,066 | 11/1992 | Tanaka et al. | 359/823 |
| 5,216,549 | 6/1993 | Notagashira et al. | 359/703 |
| 5,576,894 | 11/1996 | Kuwana et al. | 359/701 |
| 5,691,854 | 11/1997 | Yoshida et al. | 359/823 |
| 5,748,388 | 5/1998 | Nomura et al. | 359/700 |
| 5,765,048 | 6/1998 | Nomura et al. | 396/72 |

*Primary Examiner*—Loha Ben
*Attorney, Agent, or Firm*—Greenblum & Bernstein, P.L.C.

[57] ABSTRACT

A lens barrel which includes: a cam ring having a plurality of cam slots; a follower barrel on which the cam ring is slidably fitted; a plurality of follower projections formed on the follower barrel to be respectively fitted in the plurality of cam slots; a plurality of ring members respectively fixed to the plurality of follower projections to each project outwardly from an outer periphery of the cam ring in a radial direction; a plurality of washers respectively held between the plurality of follower projections and the plurality of ring members, each of the plurality of washers being formed to have a diameter larger than a width of a corresponding one of the plurality of cam slots so that at least a rim of the each of the plurality of washers contacts the outer periphery of the cam ring.

18 Claims, 20 Drawing Sheets

LENS BARREL HAVING A CAM MECHANISM

BACKGROUND OF THE INVENTION

1. Field of the Invention

The present invention relates to a lens barrel having a moving barrel and a cam mechanism for driving the moving barrel to move in the optical axis direction.

2. Description of the Related Art

A zoom lens in which a moving barrel (first barrel) is guided along an optical axis without rotating thereabout relative to another barrel (second barrel) is well known. The zoom lens is driven to move along the optical axis by a cam mechanism including a cam ring arranged concentrically to the first barrel. The cam ring is provided with a plurality of cam slots in which a corresponding plurality of followers are respectively fitted, so that the first barrel moves along the optical axis relative to the second barrel when the cam ring rotates about the optical axis relative to the first barrel.

In such a conventional zoom lens there is a possibility of the followers running off the cam slots if the moving barrel is forced to move along the optical axis by a strong external force, in the case where the lead of the cam slots is large, i.e., where the cam slots are formed such that the moving barrel moves by a large distance along the optical axis for an amount of rotation of the moving barrel relative to the second barrel; particularly in the case where the amount of engagement of each of the followers with the corresponding cam slot is small. Therefore, in a conventional zoom lens having such a structure in which the amount of engagement of each of the followers with the corresponding cam slot is small, the strength of the cam mechanism is insufficient while there is excessive play in the cam mechanism.

SUMMARY OF THE INVENTION

The primary object of the present invention is to provide a lens barrel having a moving barrel and a cam mechanism for driving the moving barrel to move in the optical axis direction, wherein a sufficient strength of the cam mechanism without excessive play in the cam mechanism is realized by a simple mechanism.

To achieve the former object mentioned above, according to an aspect of the present invention, there is provided a lens barrel which includes: a cam ring having at least one cam slot; a follower barrel on which the cam ring is slidably fitted; at least one follower projection formed on the follower barrel to be respectively fitted in the at least one cam slot; at least one radially projecting member respectively provided on the at least one follower projection to each project outwardly from an outer periphery of the cam ring in a radial direction; at least one washer respectively provided between the at least one follower projection and the at least one radially projecting member, each of the at least one washer being formed to have a diameter larger than a width of a corresponding one of the at least one cam slot so that at least a rim of the each of the at least one washer contacts the outer periphery of the cam ring.

Preferably, the at least one follower projection is. integrally formed on the follower barrel.

Preferably, the at least one radially projecting member is fixed to the at least one follower projection after the cam ring has been fitted on the follower barrel with the at least one follower projection being respectively fitted in the at least one cam slot.

Preferably, each of the at least one radially projecting member is a ring member which is fixed to a corresponding one of the at least one follower projection through a set screw screwed in the corresponding one of the at least one follower projection.

Preferably, the ring member is fixed to the corresponding one of the at least one follower projection to be rotatable about the set screw.

The at least one washer may be integrally formed with the at least one radially projecting member, respectively.

Preferably, the at least one cam slot is each formed such that a cross-section along a plane perpendicular to a longitudinal direction thereof tapers in a direction away from an optical axis of the lens barrel, and wherein the at least one follower projection is each formed to have a trapezoidal cross-sectional shape projecting away from the optical axis in a radial direction so as to be firmly fitted in the at least one cam slots, respectively.

Preferably, a camera is provided with the lens barrel, wherein the camera includes a stationary block on which the stationary barrel is integrally formed.

According to another aspect of the present invention, there is provided a lens barrel which includes: a cam ring having a plurality of cam slots; a follower barrel on which the cam ring is slidably fitted; a plurality of follower projections formed on the follower barrel to be respectively fitted in the plurality of cam slots; a plurality of radially projecting members respectively provided on the plurality of follower projections to each project outwardly from an outer periphery of the cam ring in a radial direction; a plurality of washers respectively held between the plurality of follower projections and the plurality of radially projecting members, each of the plurality of washers being formed to have a diameter larger than a width of a corresponding one of the plurality of cam slots so that at least a rim of the each of the plurality of washers contacts the outer periphery of the cam ring.

According to yet another aspect of the present invention, there is provided a telescoping type of zoom lens having first, second and third barrels concentrically arranged in this order from an optical axis, the telescoping type of zoom lens including: a plurality of cam slots formed on the second barrel and extending parallel to one another at an oblique angle with respect to a direction of the optical axis; a plurality of guide grooves formed on an inner periphery of the third barrel; a plurality of followers formed on an outer periphery of the first barrel to be respectively engaged with the plurality of guide grooves through the plurality of cam slots, wherein each of the plurality of followers includes: a follower projection formed on the outer periphery of the first barrel to be fitted in a corresponding one of the plurality of cam slots; and a radially projecting member provided on the projection to be fitted in a corresponding one of the plurality of guide grooves; and a plurality of washers each held between the projection and the radially projecting member, each of the plurality of washers being formed to have a diameter larger than a width of a corresponding one of the plurality of cam slots so that at least a rim of the each of the plurality of washers contacts an outer periphery of the second barrel.

According to yet another aspect of the present invention, there is provided a cam mechanism used for a photographic lens which includes a moving barrel and a cam ring fitted on the moving barrel such that the moving barrel is movable relative to the cam ring along an optical axis of the photographic lens, the cam mechanism including: at least one cam slot formed on the cam ring extending at an oblique angle with respect to a direction of the optical axis; at least one follower projection formed on an outer periphery of the moving barrel; at least one radially projecting member respectively provided on the at least one follower projection; and at least one washer respectively provided between the at least one follower projection and the at least one radially projecting member, each of the at least one washer being formed to have a diameter larger than a width of a corresponding one of the at least one cam slot so that at least a rim of the each of the at least one washer contacts the outer periphery of the cam ring.

The present disclosure relates to subject matter contained in Japanese Patent Application No.8-290411 (filed on Oct. 31, 1996) which is expressly incorporated herein by reference in its entirety.

BRIEF DESCRIPTION OF THE DRAWINGS

The invention will be described below in detail with reference to the accompanying drawings in which similar elements are indicated by similar reference numerals, and wherein.

DESCRIPTION OF THE PREFERRED EMBODIMENT

Figure 18:
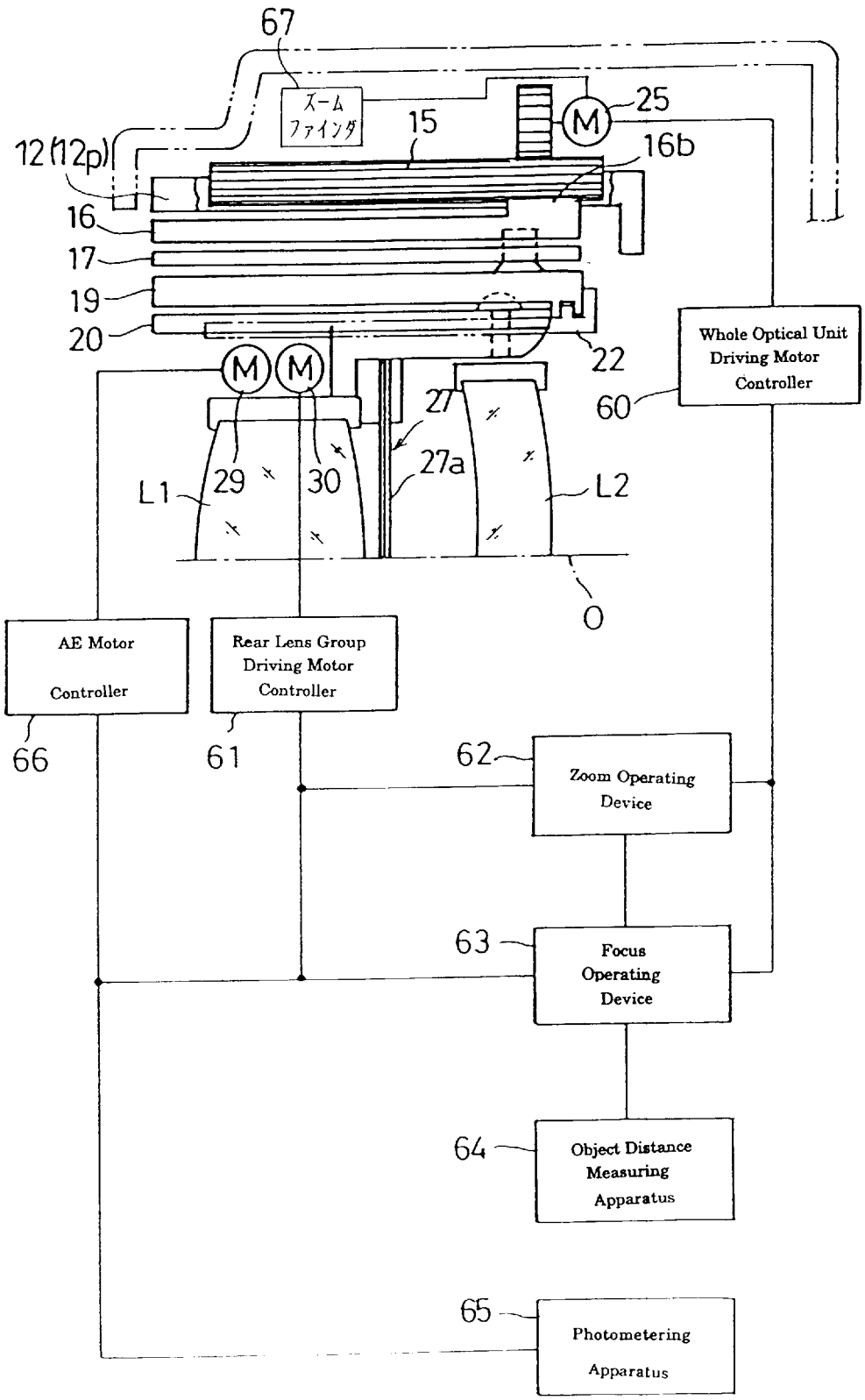
FIG. 18 is block diagram of a controlling system for controlling an operation of the zoom lens barrel.

FIG. 18 is a schematic representation of various elements which comprise a preferred embodiment of a zoom lens camera to which the present invention is applied. The concept of the present zoom lens camera will now be described with reference to FIG. 18.

The zoom lens camera is provided with a zoom lens barrel (zoom lens) 10 of a three-stage delivery type (telescoping type) having three moving barrels, namely a first moving barrel 20, a second moving barrel (follower barrel) 19 and a third moving barrel (guide barrel) 16, which are concentrically arranged in this order from an optical axis O. In the zoom lens barrel 10 two lens groups are provided as a photographic optical system, namely a front lens group L1 having positive power and a rear lens group L2 having negative power.

In the camera body, a whole optical unit driving motor controller 60, a rear lens group driving motor controller 61, a zoom operating device 62, a focus operating device 63, an object distance measuring apparatus 64, a photometering apparatus 65, and an AE (i.e., automatic exposure) motor controller 66, are provided.

The zoom operating device 62 can be provided in the form of, for example, a manually-operable zoom operating lever (not shown) provided on the camera body or a pair of zoom buttons, e.g., a "wide" zoom button and a "tele" zoom button, (not shown) provided on the camera body. When the zoom operating device 62 is operated, the whole optical unit driving motor controller 60 drives a whole optical unit driving motor 25 to move the front lens group Li and the rear lens group L2, rearwardly or forwardly without regard to a focal length and a focal point thereof. In the following explanation, forward and rearward movements of the lens groups L1 and L2 by the whole optical unit driving motor controller 60 (the motor 25) are referred to as the movement toward "tele" and the movement toward "wide" respectively, since forward and rearward movements of the lens groups L1 and L2 occur when the zoom operating device 62 is operated to "tele" and "wide" positions.

The image magnification of the visual field of a zoom finder 67 provided in the camera body varies in sequence with the variation of the focal length through the operation of the zoom operating device 62. Therefore, the photographer can perceive the variation of the focal length by observing the variation of image magnification of the visual field of the finder. In addition, the focal length, set by the operation of the zoom operating device 62, may be perceived by a value indicated on an LCD (liquid crystal display) panel (not shown) or the like.

When the focus operating device 63 is operated, the whole optical unit driving motor controller 60 drives the whole optical unit driving motor 25. At the same time the rear lens group driving motor controller 61 drives a rear lens group driving motor 30. Due to the driving of the whole optical unit driving motor controller 60 and the rear lens group driving motor controller 61, the front and rear lens groups L1 and L2 are moved to respective positions corresponding to a set focal length and a detected object distance and thereby the zoom lens is focused on the subject.

Specifically, the focus operating device 63 is provided with a release button (not shown) provided on an upper wall of the camera body. A photometering switch and a release switch (both not shown) are synchronized with the release button. When the release button is half-depressed (half step), the focus operating device 63 causes the photometering switch to be turned ON, and the object distance measuring and photometering commands are respectively input to the object distance measuring apparatus 64 and the photometering apparatus 65.

When the release button is fully depressed (full step), the focus operating device 63 causes the release switch to be turned ON, and according to the result of object distance measuring demand and a set focal length, the whole optical unit driving motor 25 and the rear lens group driving motor 30 are driven, and the focusing operation, in which the front lens group L1 and the rear lens group L2 move to the focusing position, is executed. Further, an AE motor 29 of an AF/AE (i.e., autofocus/autoexposure) shutter unit (electrical unit) 21 is driven via the AE motor controller 66 to actuate a shutter 27. During the shutter action, the AE motor controller 66 drives the AE motor 29 to open shutter blades 27a of the shutter 27 for a specified period of time according to the photometering information output from the photometering apparatus 65.

When the zoom operating device 62 is operated, the zoom operating device 62 drives the whole optical unit driving motor 25 to move the front and rear lens groups L1 and L2 together as a whole in the direction of the optical axis O (optical axis direction). Simultaneous with such a movement, the rear lens group driving motor 30 may also be driven via the rear lens group driving motor controller 61 to move the rear lens group L2 relative to the first lens group L1. However, this is not performed under the conventional concept of zooming in which the focal length is varied sequentially without moving the position of the focal point. When the zoom operating device 62 is operated, the following two modes are available, namely:

1. a mode to move the front lens group L1 and the rear lens group L2 in the optical axis direction without varying the distance therebetween by driving only the whole optical unit driving motor 25; and,
2. a mode to move the front lens group L1 and the rear lens group L2 in the optical axis direction while varying the distance therebetween by driving both the whole optical unit driving motor 25 and the rear lens group driving motor 30.

In mode 1, during a zooming operation an in-focus condition cannot be obtained at all times with respect to a subject located at a specific distance. However, this is not a problem in a lens-shutter type camera, since the image of the subject is not observed through the photographing optical system, but through the finder optical system that is provided separate from the photographing optical system, and it is sufficient to only be focused when the shutter is released. In mode 2, during a zooming operation, the front lens group L1 and the rear lens group L2 are moved without regard to whether the focal point moves, and when the shutter is released, the focusing operation (focus adjusting operation) is carried out by moving both the whole optical unit driving motor 25 and the rear lens group driving motor 30.

When the focus operating device 63 is operated in at least one part of the focal length range set by the zoom operating device 62, the whole optical unit driving motor 25 and the rear lens group driving motor 30 are driven to bring the subject into focus. The amount of movement of each lens group L1 or L2 by the whole optical unit driving motor 25 and the rear lens group driving motor 30 is determined not only using subject distance information provided from the object distance measuring apparatus 64, but also by using focal length information set by the zoom operating device 62. In such a manner, when the focus operating device 63 is operated, by moving both the whole optical unit driving motor 25 and the rear lens group driving motor 30, the position of the lens groups L1, L2 can be flexibly controlled, as compared with lens movements controlled by cam.

The zoom lens camera of this embodiment can also be controlled in a different manner such that, during an operation of the zoom operating device 62, only the magnification of the zoom finder 67 and the focal length information are varied without driving either the whole optical unit driving motor 25 or the rear lens group driving motor 30. When the focus operating device 63 is operated, both the whole optical unit driving motor 25 and the rear lens group driving motor 30 are moved simultaneously according to the focal length information and the subject distance information obtained by the object distance measuring apparatus 64 to move the front lens group L1 and the rear lens group L2 to respective positions determined according to the focal length and the subject distance information.

An embodiment of the zoom lens barrel according to the above concept will now be described with reference to mainly FIGS. 5 and 14.

The overall structure of the zoom lens barrel 10 is described first.

The zoom lens barrel 10 is provided with the first moving barrel 20, the second moving barrel 19, the third moving barrel 16, and a fixed lens barrel block 12. The third moving barrel 16 is engaged with a cylindrical portion 12p of the fixed lens barrel block 12, and moves in the optical axis direction upon being rotated. The third moving barrel 16 is provided on an inner periphery thereof with a linear guide barrel (cam ring) 17, which is restricted in rotation. The linear guide barrel 17 and the third moving barrel 16 move together as a whole in the optical axis direction, with the third moving barrel 16 rotating relative to the linear guide barrel 17. The first moving barrel 20 moves in the optical axis direction with rotation thereof being restricted. The second moving barrel 19 moves in the optical axis direction, while rotating relative to the linear guide barrel 17 and the first moving barrel 20. The whole optical unit driving motor 25 is secured to the fixed lens barrel block 12. A shutter mounting stage 40 is secured to the first moving barrel 20. The AE motor 29 and the rear lens group driving motor 30 are mounted on the shutter mounting stage 40. The front lens group L1 and the rear lens group L2 are respectively supported by a lens supporting barrel (lens supporting annular member) 34 and a lens supporting barrel 50.

The fixed lens barrel block 12 is fixed in front of an aperture plate 14 fixed to the camera body. The aperture plate 14 is provided on a center thereof with a rectangular-shaped aperture 14a which forms the limits of each frame exposed. The fixed lens barrel block 12 is provided, on an inner periphery of the cylindrical portion 12p, with a female helicoid 12a, and also a plurality of linear guide grooves 12b each extending parallel to the optical axis O, i.e., extending in the optical axis direction. At the bottom of one of the linear guide grooves 12b, namely 12b', a code plate 13a, having a predetermined code pattern, is fixed. The code plate 13a extends in the optical axis direction and extends along substantially the whole of the length of the fixed lens barrel block 12. The code plate 13a is part of a flexible printed circuit board 13 positioned outside the fixed lens barrel block 12.

Figure 5:
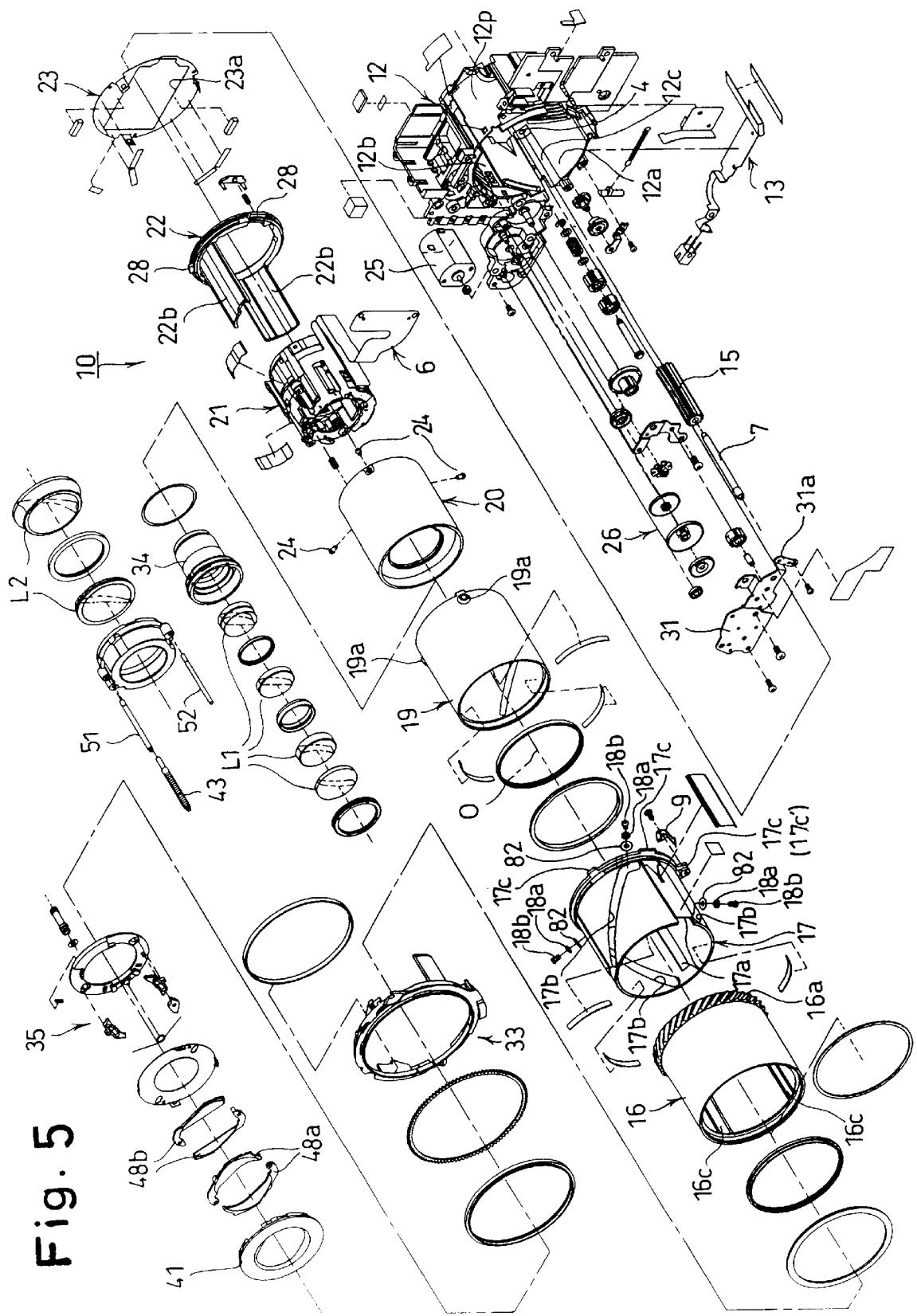
FIG. 5 is an exploded perspective view of the overall structure of the zoom lens barrel.
Figure 13:
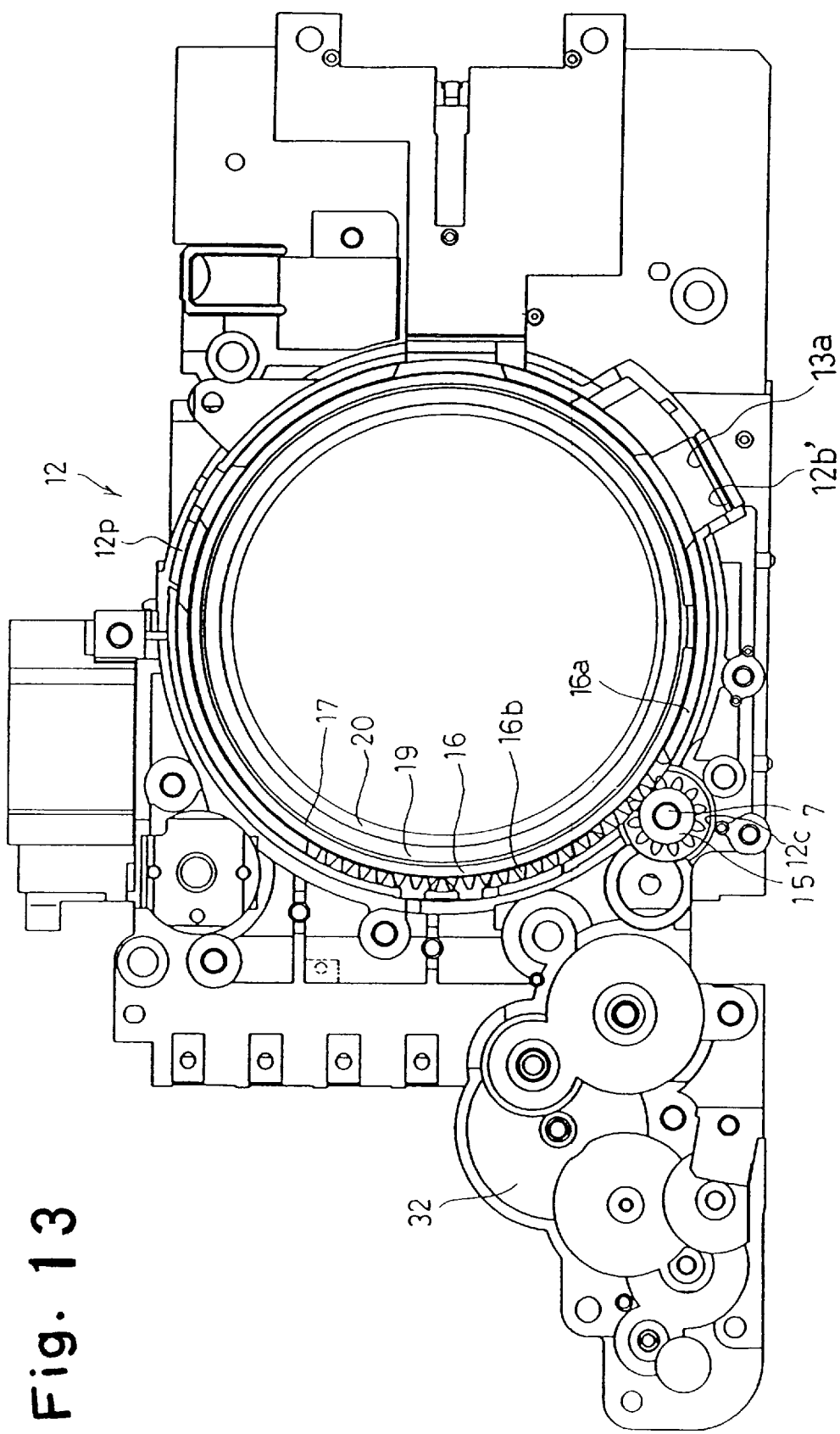
FIG. 13 is a front elevational view of a fixed lens barrel block of the zoom lens barrel.

In the fixed lens barrel block 12, a gear housing 12c, which is recessed outwardly from an inner periphery of the cylindrical portion 12p of the fixed lens barrel block 12 in a radial direction while extending in the optical axis direction, is provided as shown in FIG. 5 or 13. In the gear housing 12c, a driving pinion 15, extending in the optical axis direction, is rotatably held. Both ends of an axial shaft 7 of the driving pinion 15 are rotatively supported by a supporting cavity 4, provided in the fixed lens barrel block 12, and a supporting cavity 31a, provided on a gear supporting plate 31 fixed on the fixed lens barrel block 12 by set screws (not shown), respectively. Part of the teeth of the driving pinion 15 project inwardly from the inner periphery of the cylindrical portion 12p of the fixed lens barrel block 12 so that the driving pinion 15 meshes with an outer peripheral gear 16b of the third moving barrel 16, as shown in FIG. 13.

Figure 6:
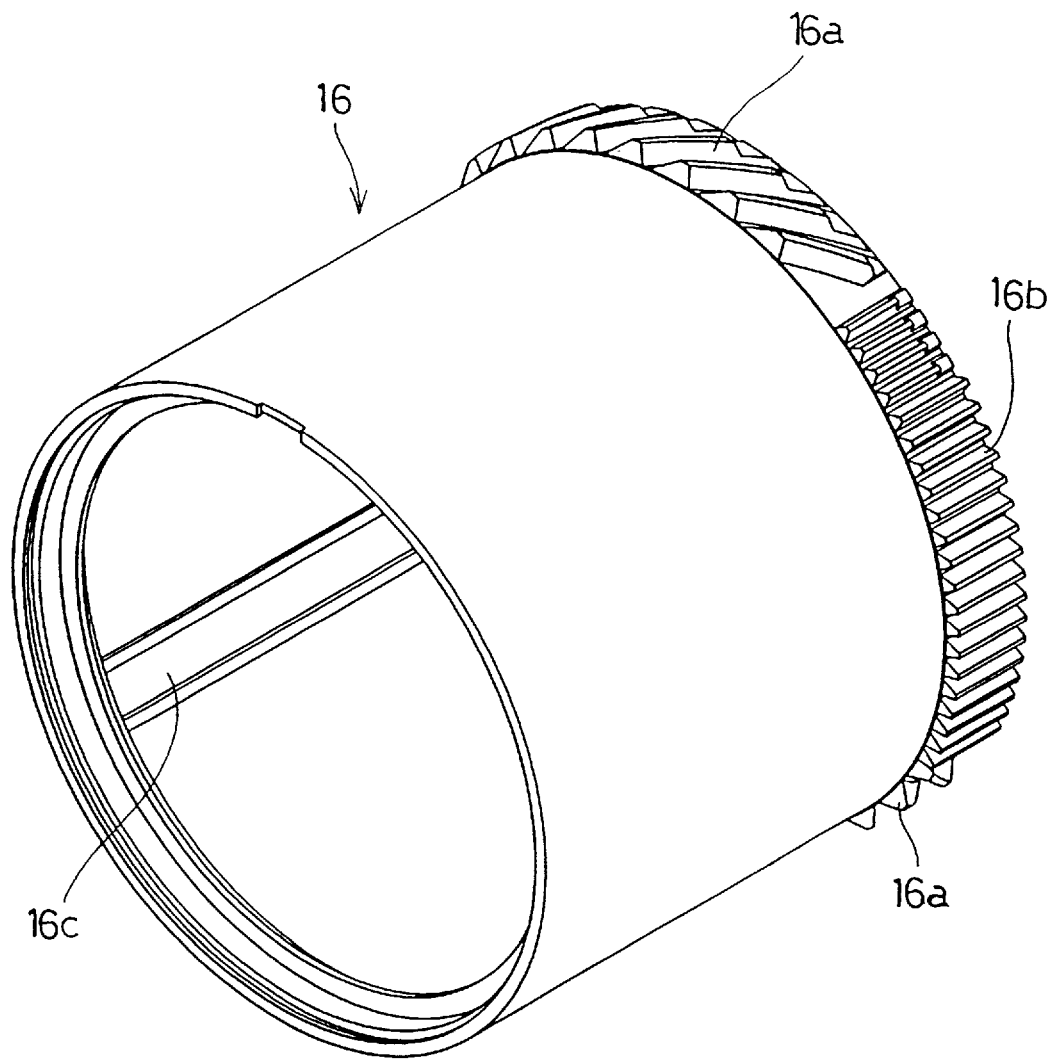
FIG. 6 is a perspective view of a third moving barrel of the zoom lens barrel.

On an inner periphery of the third moving barrel 16, a plurality of linear guide grooves 16c, each extending parallel to the optical axis O, are formed. At an outer periphery of the rear end of the third moving barrel 16, a male helicoid 16a and the aforementioned outer peripheral gear 16b are provided as shown in FIG. 6. The male helicoid 16a engages with the female helicoid 12a of the fixed lens barrel block 12. The outer peripheral gear 16b engages with the driving pinion 15. The driving pinion 15 has an axial length sufficient to be capable of engaging the outer peripheral gear 16b throughout the entire range of movement of the third moving barrel 16 in the optical axis direction.

Figure 7:
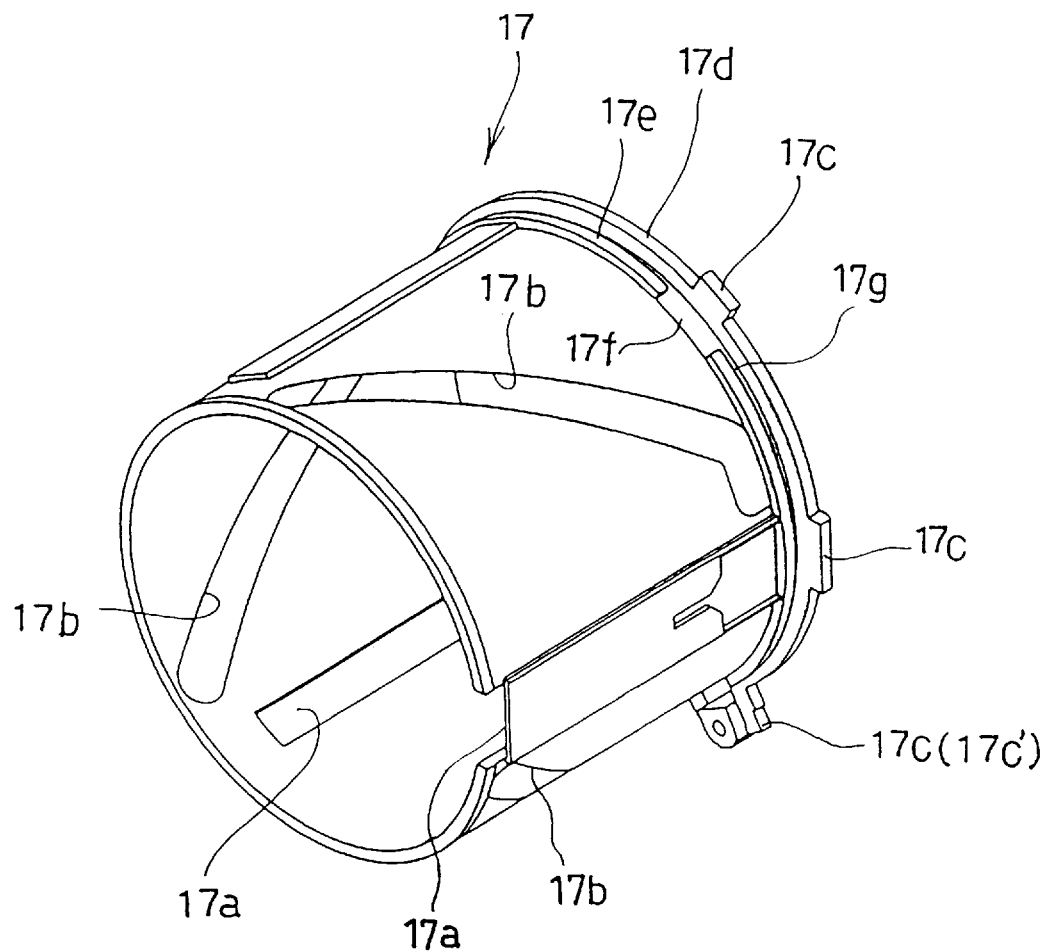
FIG. 7 is a perspective view of the linear guide barrel, the outer periphery of which is shown in FIG. 3.
Figure 8:
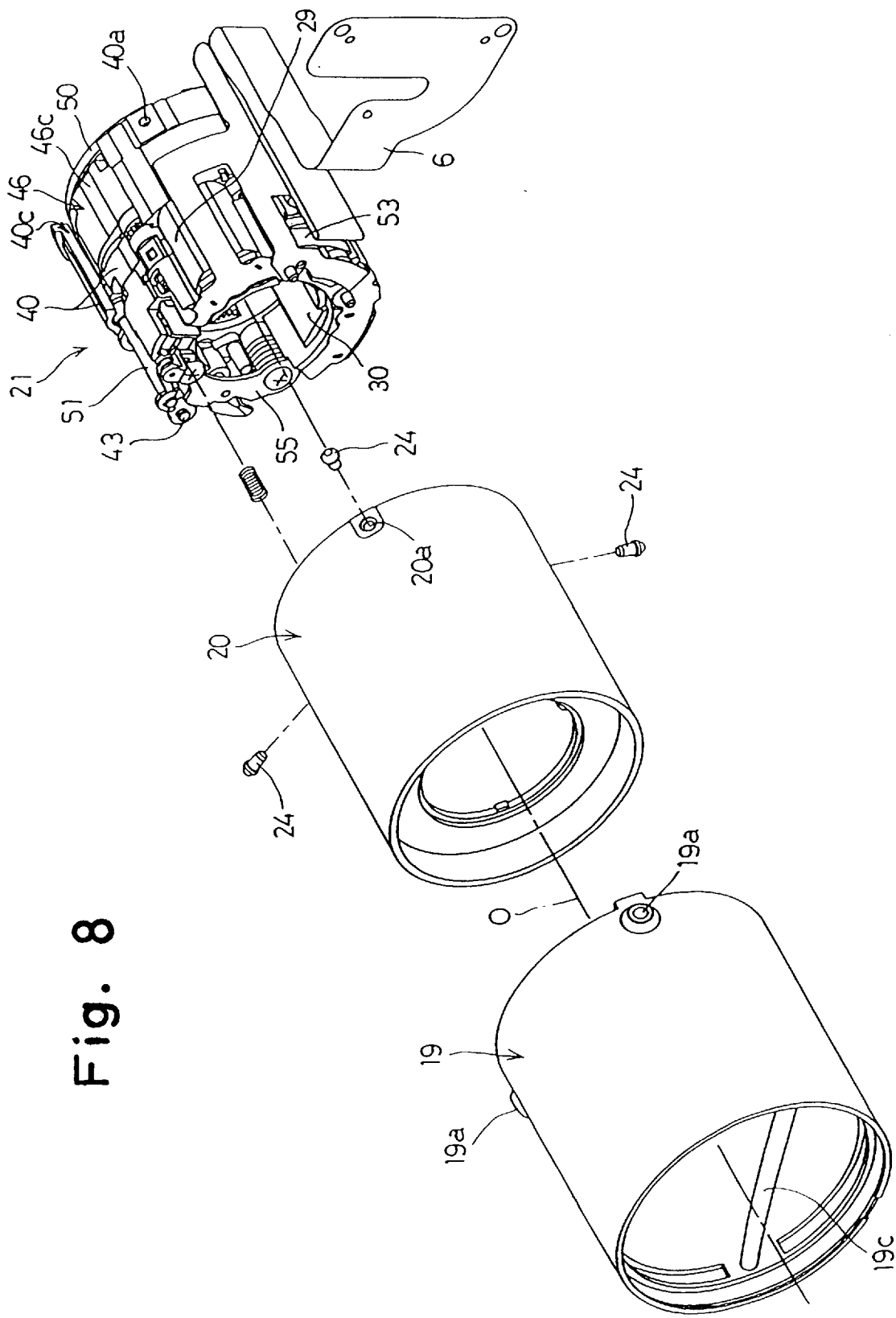
FIG. 8 is an exploded perspective view of a part of the zoom lens barrel.
Figure 17:
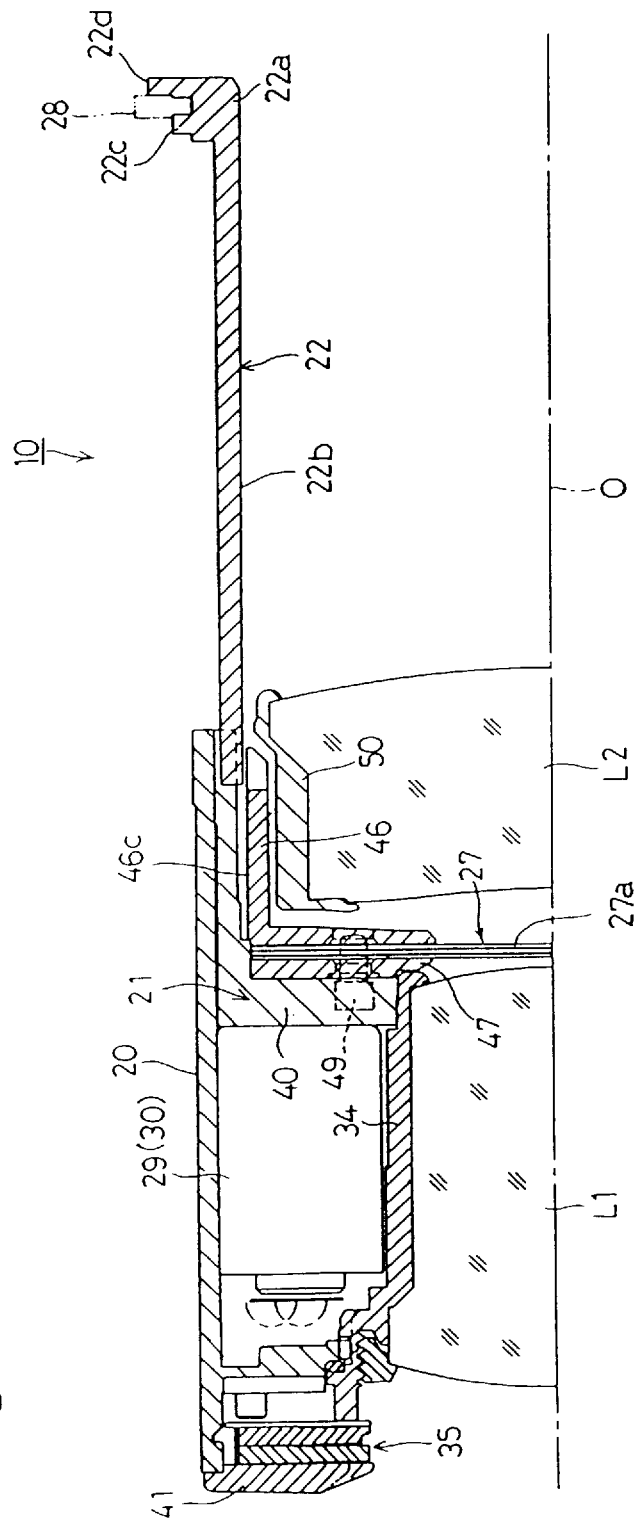
FIG. 17 is a sectional view of the upper part of the zoom lens barrel shown in FIG. 16 in the maximum extended state.

As shown in FIG. 7, the linear guide barrel 17 is provided, on a rear part of an outer periphery thereof, with a rear end flange 17d. The rear end flange 17d has a plurality of engaging projections 17c each projecting away from the optical axis O in a radial direction. The linear guide barrel 17 is further provided, in front of the rear end flange 17d, with a retaining flange 17e. A circumferential groove 17g is formed between the rear end flange 17d and the retaining flange 17e. The retaining flange 17e has a radius smaller than the rear end flange 17d. The retaining flange 17e is provided with a plurality of cutout portions 17f. Each of the cutout portions 17f allows a corresponding engaging projection 16d to be inserted into the circumferential groove 17g, as shown in FIG. 17.

The third moving barrel 16 is provided, on an inner periphery of the rear end thereof, with a plurality of engaging projections 16d. Each of the engaging projections 16d projects towards the optical axis O in a radial direction. By inserting the engaging projections 16d into the circumferential groove 17g, through the corresponding cutout portions 17f, the engaging projections 16d are positioned in the circumferential groove 17g between the flanges 17d and 17e (see FIG. 14). By rotating the third moving barrel 16 relative to the linear guide barrel 17, the engaging projections 16d are engaged with the linear guide barrel 17.

On the rear end of the linear guide barrel 17, an aperture plate 23 having a rectangular-shaped aperture 23a approximately the same shape as the aperture 14a, is fixed.

The relative rotation of the linear guide barrel 17, with respect to the fixed lens barrel block 12, is restricted by the slidable engagement of the plurality of engaging projections 17c with the corresponding linear guide grooves 12b, formed parallel to the optical axis O.

A contacting terminal 9 (see FIG. 5) is fixed to one of the engaging projections 17c, namely 17c'. The contacting terminal 9 is in slidable contact with the code plate 13a, fixed to the bottom of the linear guide groove 12b', to generate signals corresponding to focal length information during zooming.

Figure 1:
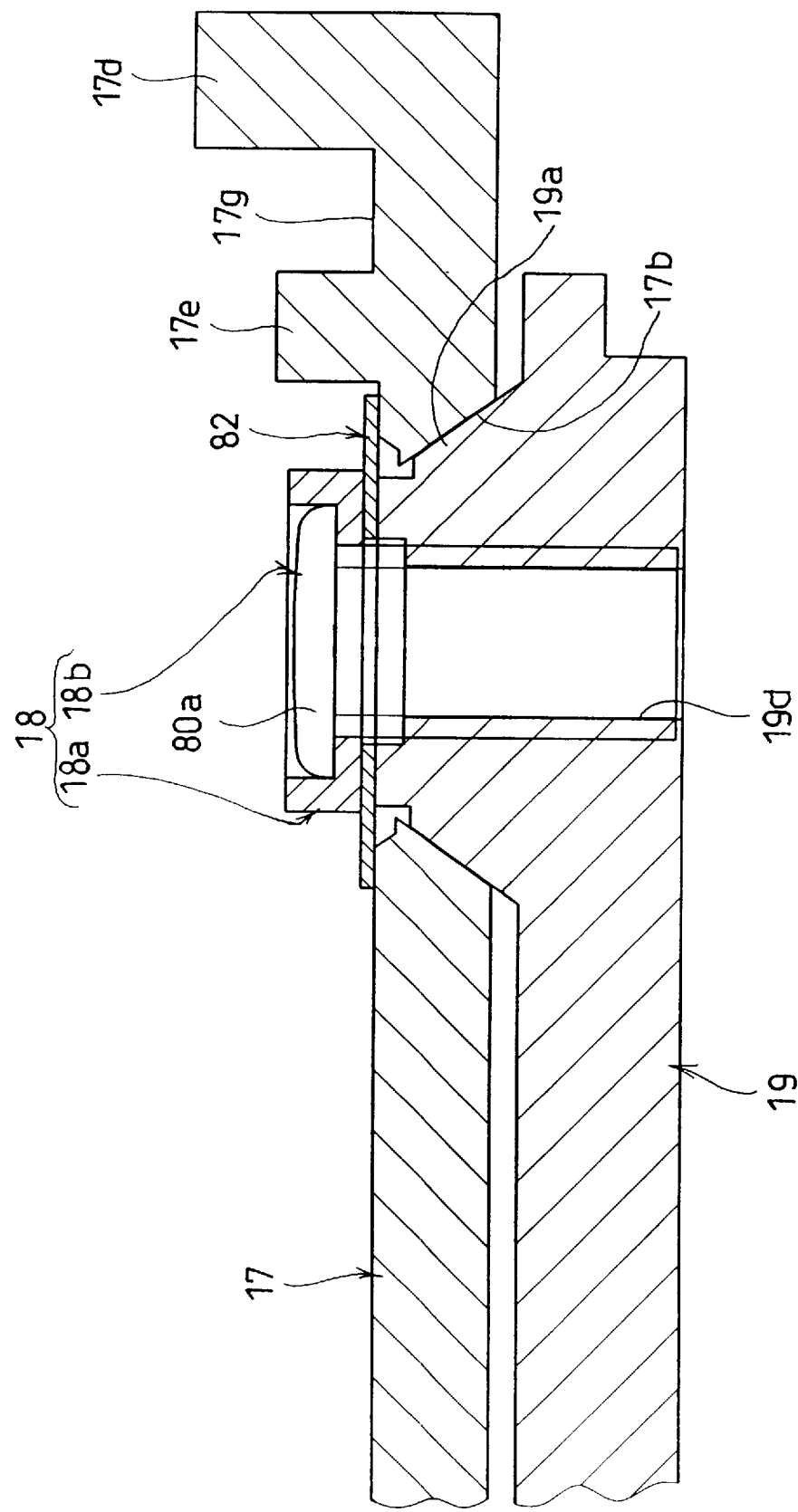
FIG. 1 is a sectional view of a part of a zoom lens barrel to which the present invention is applied in an assembled state.
Figure 2:
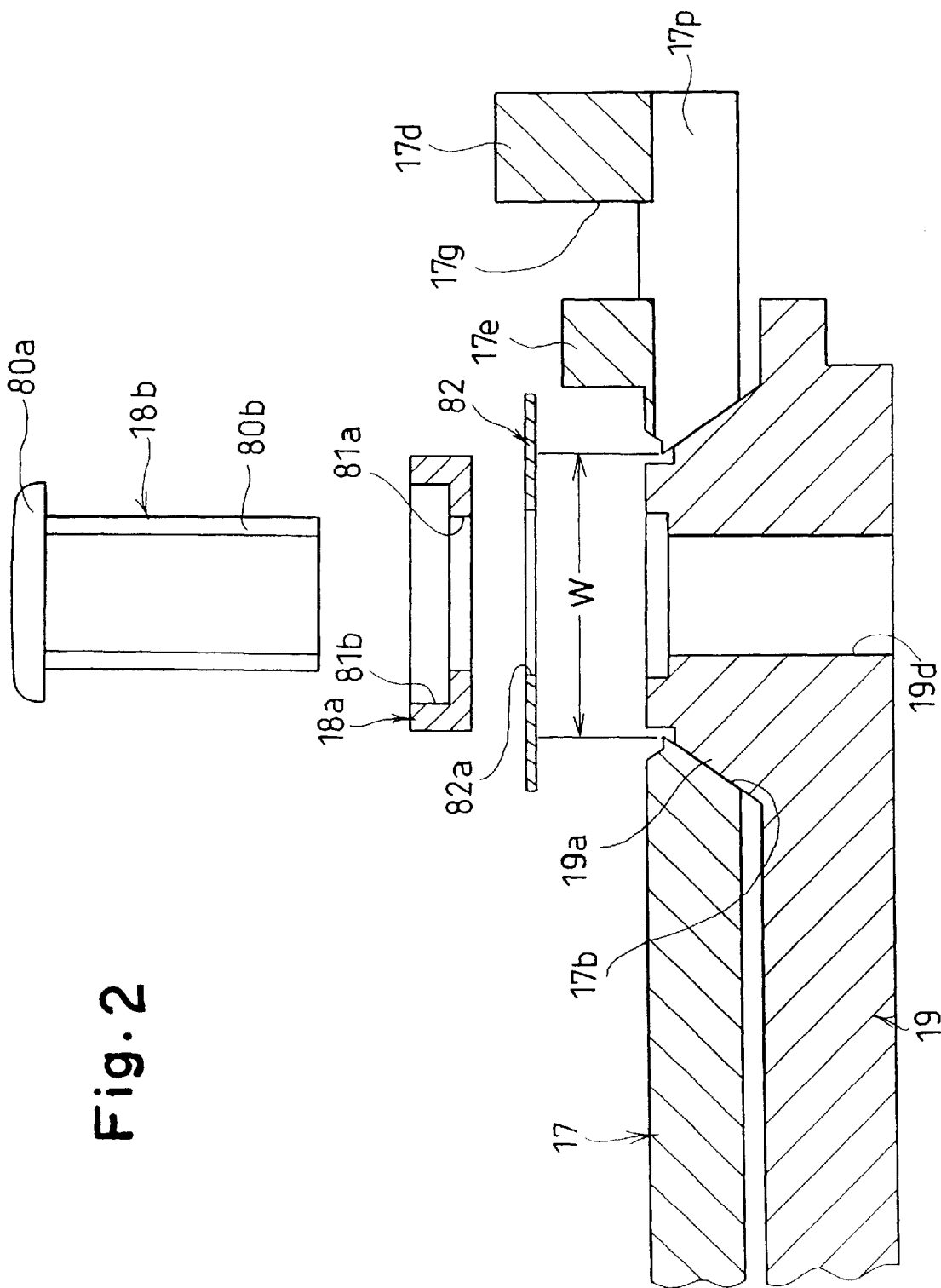
FIG. 2 is an exploded sectional view of the part of the zoom lens barrel shown in FIG. 1.
Figure 3:
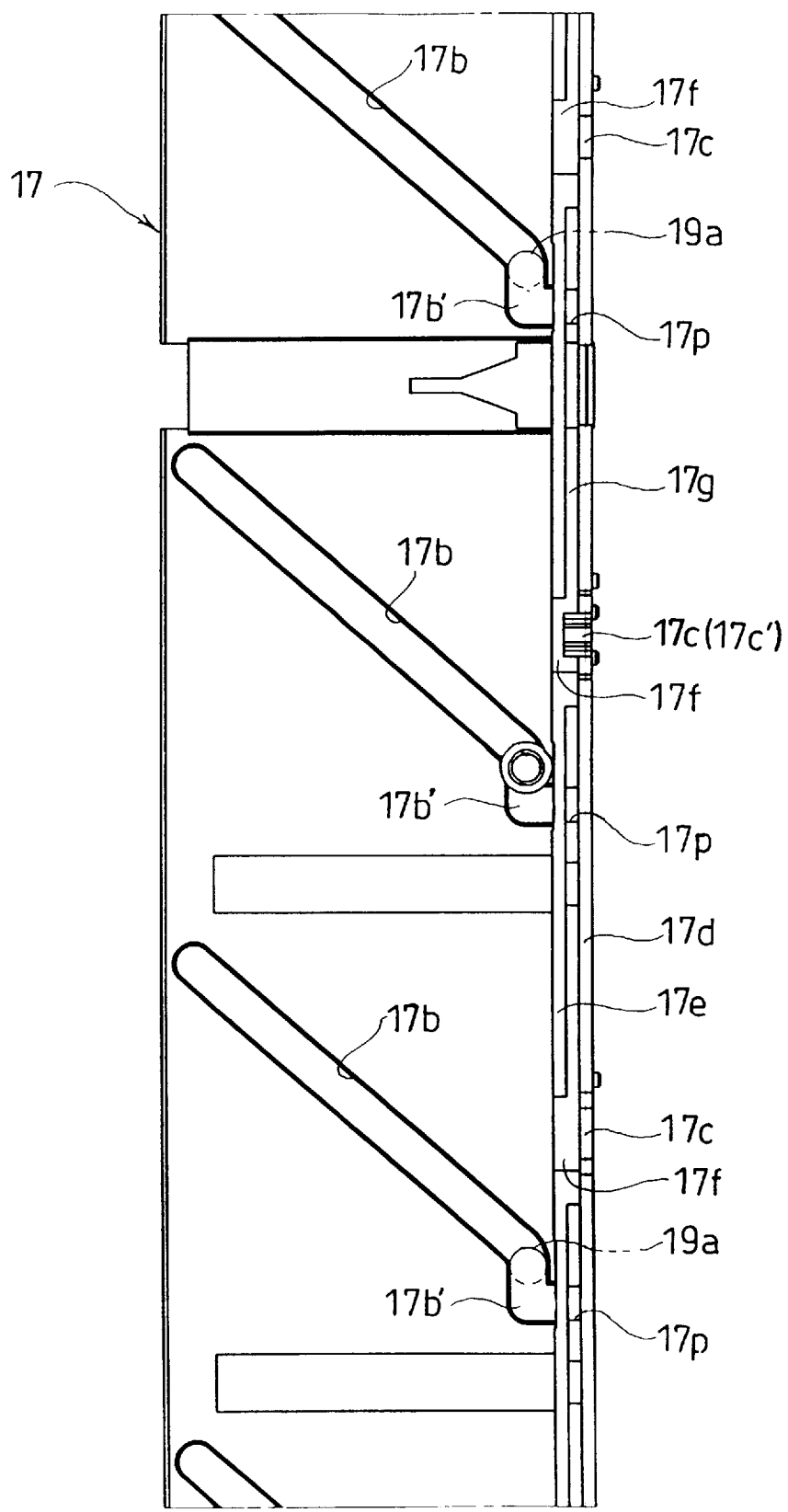
FIG. 3 is a developed view of the outer periphery of a linear guide/barrel.
Figure 4:
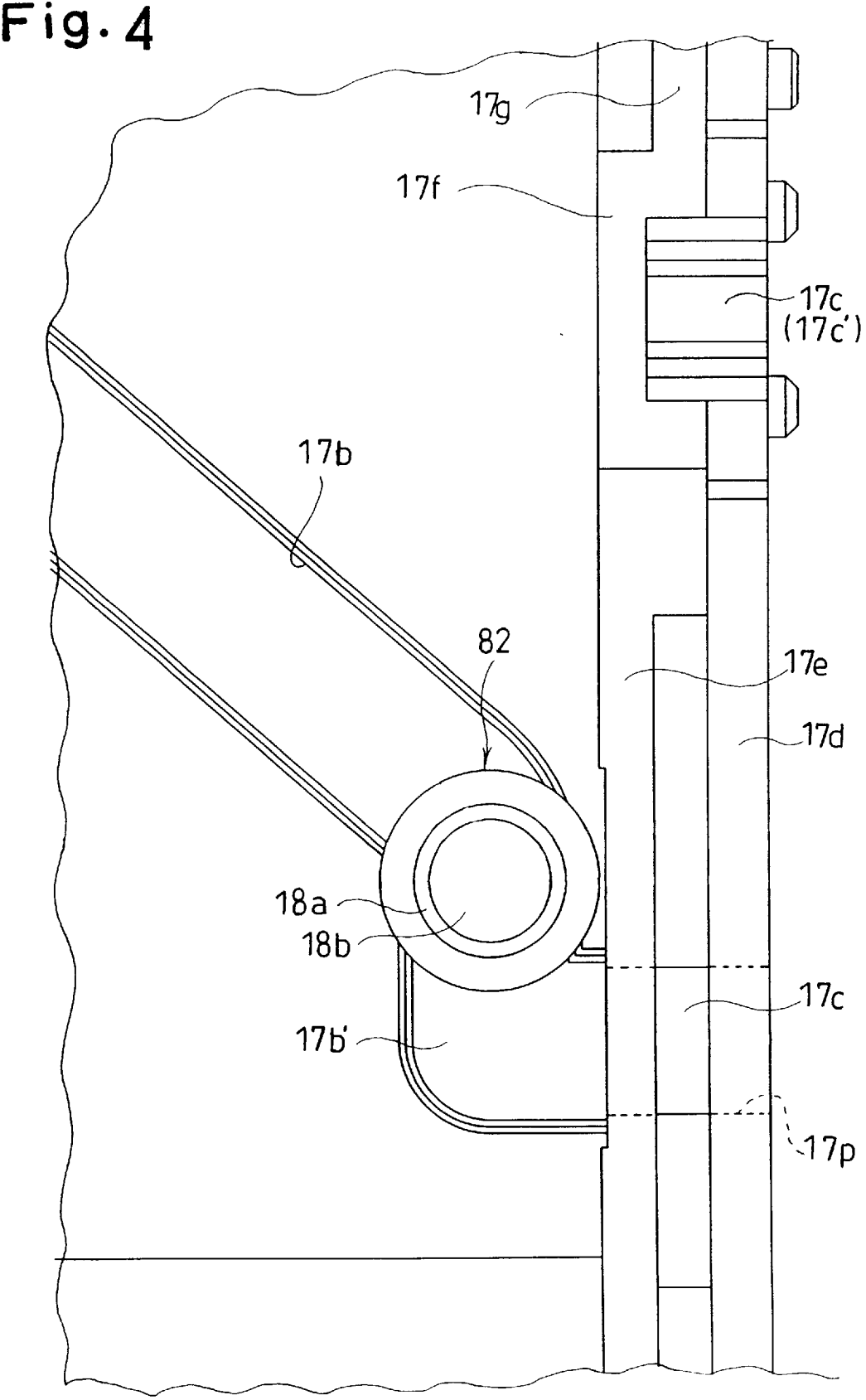
FIG. 4 is an enlarged view of a part of the outer periphery of the linear guide barrel shown in FIG. 3.

On the inner periphery of the linear guide barrel 17 a plurality of linear guide grooves 17a are formed, each extending parallel to the optical axis O. A plurality of lead slots (cam slots) 17b are also formed on the linear guide barrel 17 as shown in FIG. 5 or 7. The lead slots 17b are each formed oblique (inclined) to the optical axis O. The linear guide barrel 17 may be provided, for example, with three linear guide grooves 17a and three lead slots 17b. More specifically, the lead slots 17b extend parallel to one another as shown in FIG. 3 and each lead slot 17b is oblique to both the optical axis direction (horizontal direction as viewed in FIG. 3) and a circumferential direction of the linear guide barrel 17 (vertical direction as viewed in FIG. 3) by a predetermined angle. Furthermore, each lead slot 17b is formed such that a cross-section along a plane perpendicular to a longitudinal direction thereof tapers in a direction away from a corresponding follower projection 19a, i.e., away from the optical axis O, to correspond to the shape of the corresponding follower projection 19a. A cross-sectional shape of each lead slot 17b along a plane perpendicular to a longitudinal direction thereof is accordingly trapezoidal corresponding to the shape of the corresponding follower projection 19a, as can be seen in FIG. 1 or 2.

The second moving barrel 19 engages with the inner periphery of the linear guide barrel 17. On the inner periphery of the second moving barrel 19, a plurality of lead grooves 19c are provided in a direction inclined oppositely to the lead slots 17b. Each lead groove 19c is oblique to both the optical axis direction and a circumferential direction of the linear guide barrel 17 by a predetermined angle, similar to each lead slot 17b. On the outer periphery of the rear end of the second moving barrel 19 a plurality of follower projections 19a are provided. Each of the follower projections 19a has a trapezoidal cross-sectional shape projecting away from the optical axis O in a radial direction. The trapezoidal cross-sectional shape corresponds to that of the corresponding lead slot 17b so that each follower projection 19a can firmly and slidably contact side surfaces (guide surfaces) of the corresponding lead slot 17b. The second moving barrel 19 is molded using a synthetic resin, specifically, a polycarbonate containing 20 percent glass fibers, and the follower projections 19a are integrally formed on the second moving barrel 19. The second moving barrel 19 may be formed from other types of synthetic resins. The linear guide barrel 17 is also molded using a polycarbonate containing 20 percent glass fibers, but may be formed from other types of synthetic resins.

A follower pin 18 is provided on each of the follower projections 19a. Each follower pin 18 consists of a ring member (radially projecting member) 18a, and a center fixing screw 18b which supports the ring member 18a on the corresponding follower projection 19a. The follower projections 19a are in slidable engagement with the lead slots 17b of the linear guide barrel 17, and the follower pins 18 are in slidable engagement with the linear guide grooves 16c of the third moving barrel 16. With such an arrangement, when the third moving barrel 16 rotates, the second moving barrel 19 moves linearly in the optical axis direction, while rotating.

A washer 82 is held between each follower projection 19a and the corresponding ring member 18a. As can be seen from FIG. 1 or 2, the outer diameter of the washer 82 is larger than a width W (see FIG. 2) of the corresponding lead slot 17b, so that the rim of the washer 82 contacts the outer periphery of the linear guide barrel 17 on respective sides of the corresponding lead slot 17b. Each ring member 18a is seated on the corresponding washer 82 to be rotatable about the corresponding center fixing screw 18b.

On the inner periphery of the second moving barrel 19, the first moving barrel 20 is engaged. The first moving barrel 20 is provided on an outer periphery of the rear thereof with a plurality of follower pins 24 each engaging with the corresponding inner lead groove 19c. At the same time the first moving barrel 20 is guided linearly by a linear guide member 22. The first moving barrel 20 is provided at the front end thereof with a decorative plate 41 secured thereto.

Figure 9:
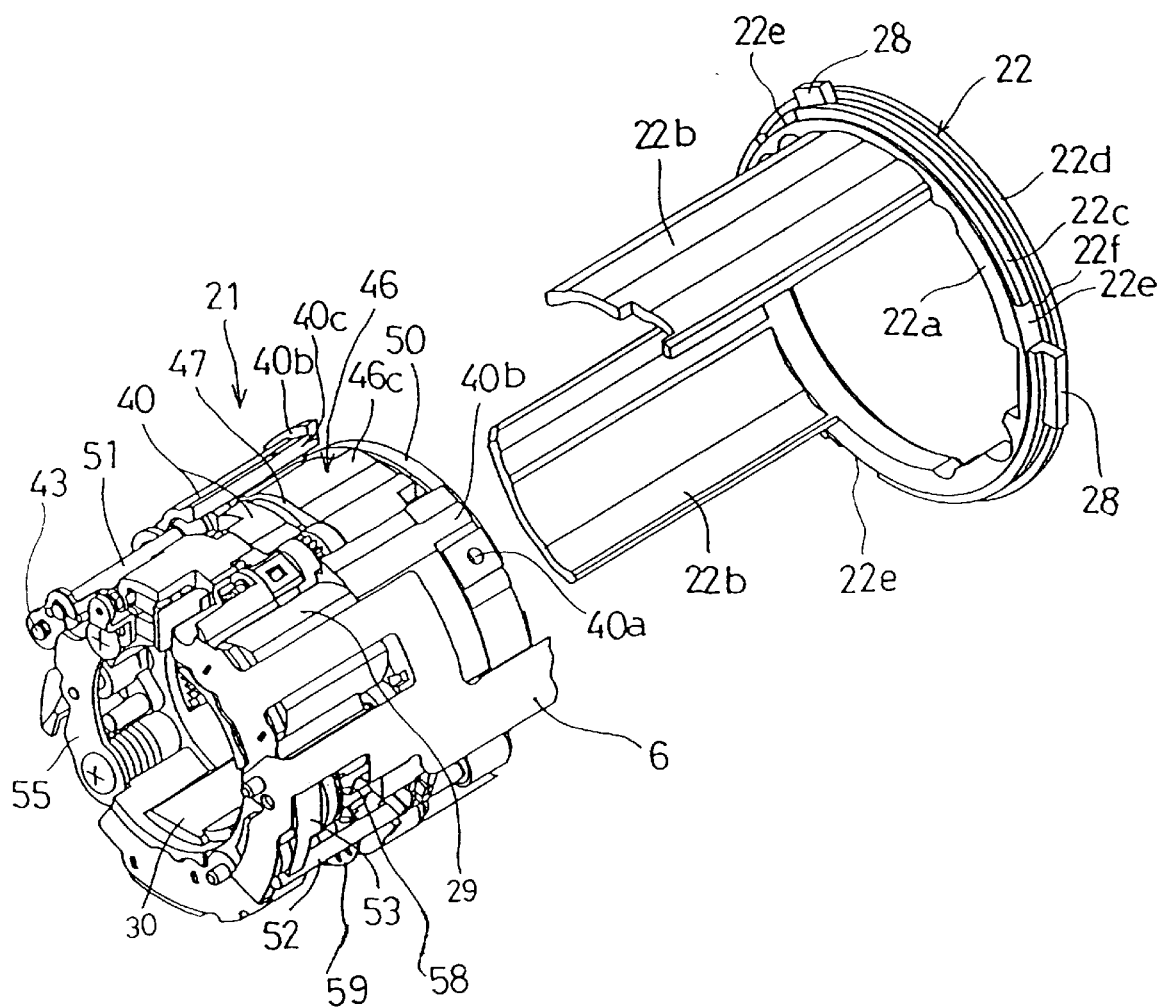
FIG. 9 is a schematic perspective view showing a part of the zoom lens barrel.
Figure 10:
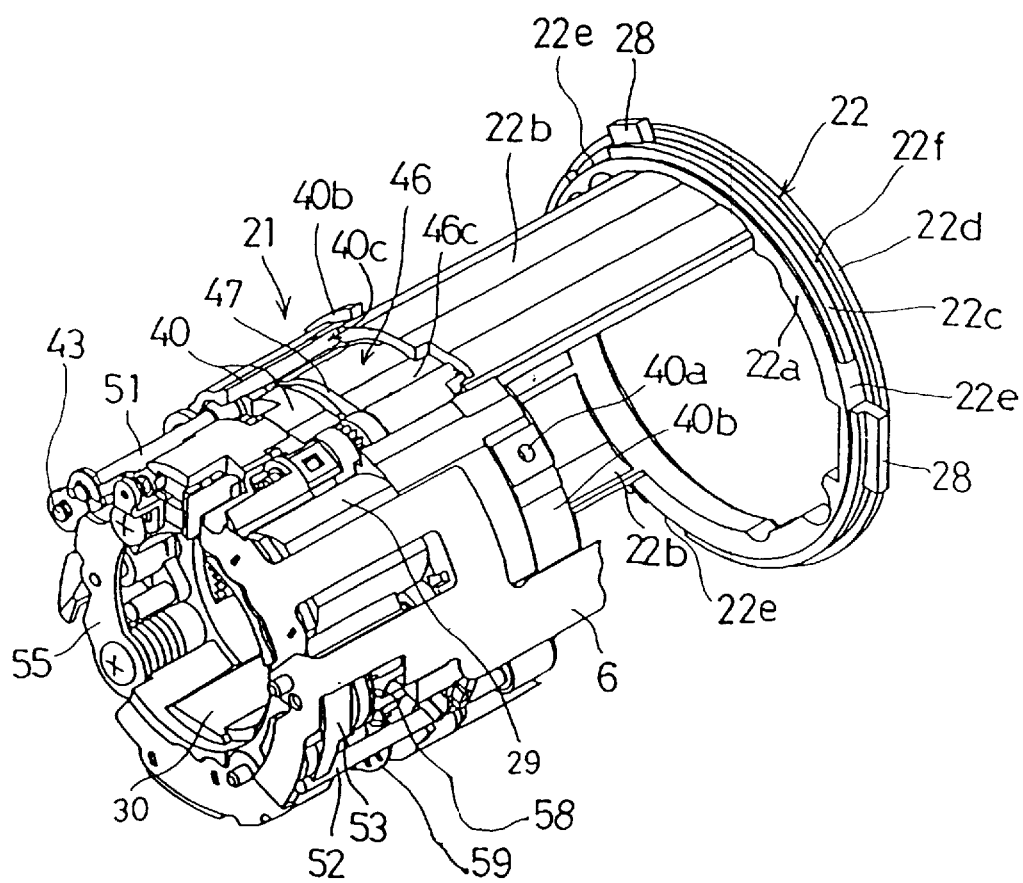
FIG. 10 is a schematic perspective view showing the part of the zoom lens barrel shown in FIG. 9 in an engaged state.

As shown in FIGS. 9 and 10, the linear guide member 22 is provided with an annular member 22a, a pair of guide legs 22b and a plurality of engaging projections 28. The pair of guide legs 22b project from the annular member 22a in the optical axis direction. The plurality of engaging projections 28 each project from the annular member 22a away from the optical axis O in a radial direction. The engaging projections 28 slidably engage with the linear guide grooves 17a. The guide legs 22b are respectively inserted into linear guides 40c between the inner peripheral surface of the first moving barrel 20 and the AF/AE shutter unit 21.

The annular member 22a of the linear guide member 22 is connected to the rear of the second moving barrel 19, such that the linear guide member 22 and the second moving barrel 19 are capable of moving along the optical axis O as a whole, and in addition are capable of relatively rotating around the optical axis O. The linear guide member 22 is further provided on the outer periphery of the rear end thereof with a rear end flange 22d. The linear guide member 22 is further provided in front of the rear end flange 22d with a retaining flange 22c. A circumferential groove 22f is formed between the rear end flange 22d and the retaining flange 22c. The retaining flange 22c has a radius smaller than the rear end flange 22d. The retaining flange 22c is provided with a plurality of cutout portions 22e, as shown in FIG. 9 or 10, each allowing a corresponding engaging projection 19b to be inserted into the circumferential groove 22f, as shown in FIG. 14.

The second moving barrel 19 is provided on an inner periphery of the rear end thereof with a plurality of engaging projections 19b, each projecting towards the optical axis O in a radial direction. By inserting the engaging projections 19b into the circumferential groove 22f through the corresponding cutout portions 22e, the engaging projections 19b are positioned in the circumferential groove 22f between the flanges 22c and 22d. By rotating the second moving barrel 19 relative to the linear guide member 22, the engaging projections 19b are engaged with the linear guide member 22. With the above structure, when the second moving barrel 19 rotates in the forward or reverse rotational direction, the first moving barrel 20 moves linearly, forwardly or rearwardly along the optical axis O, but is restricted from rotating.

Figure 11:
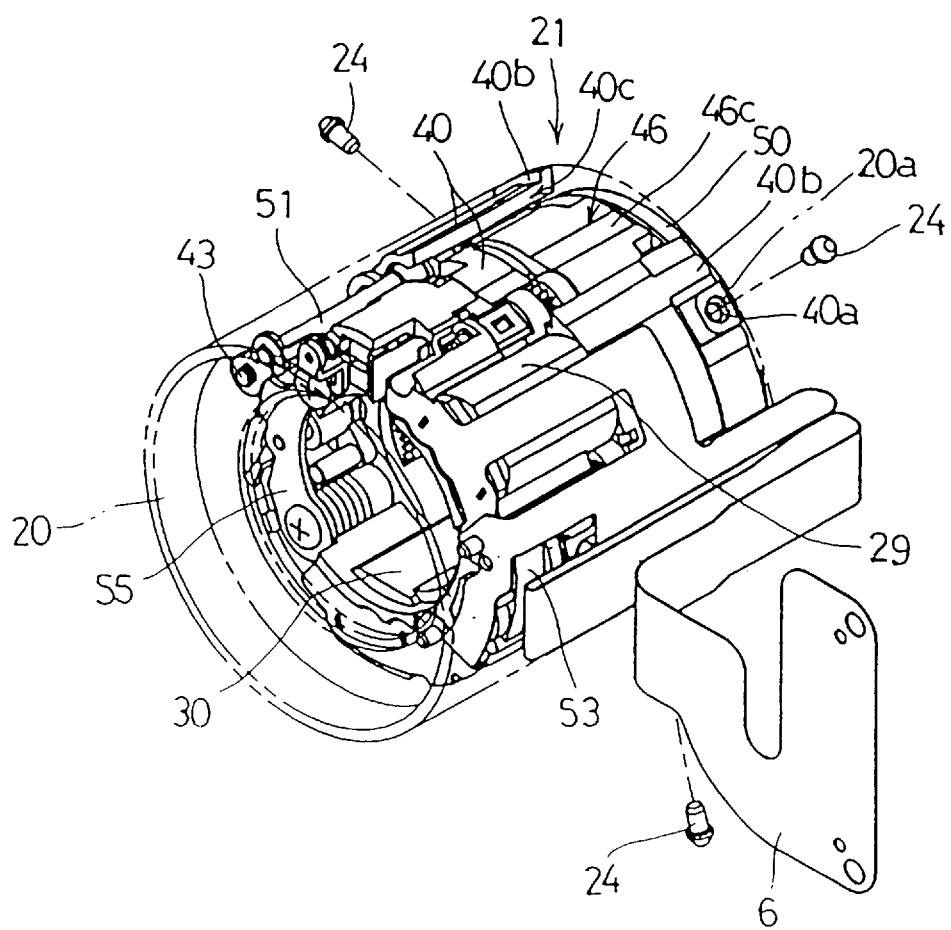
FIG. 11 is a schematic perspective view illustrating a state where an AF/AE shutter unit of the zoom lens barrel is mounted to first moving barrel.
Figure 12:
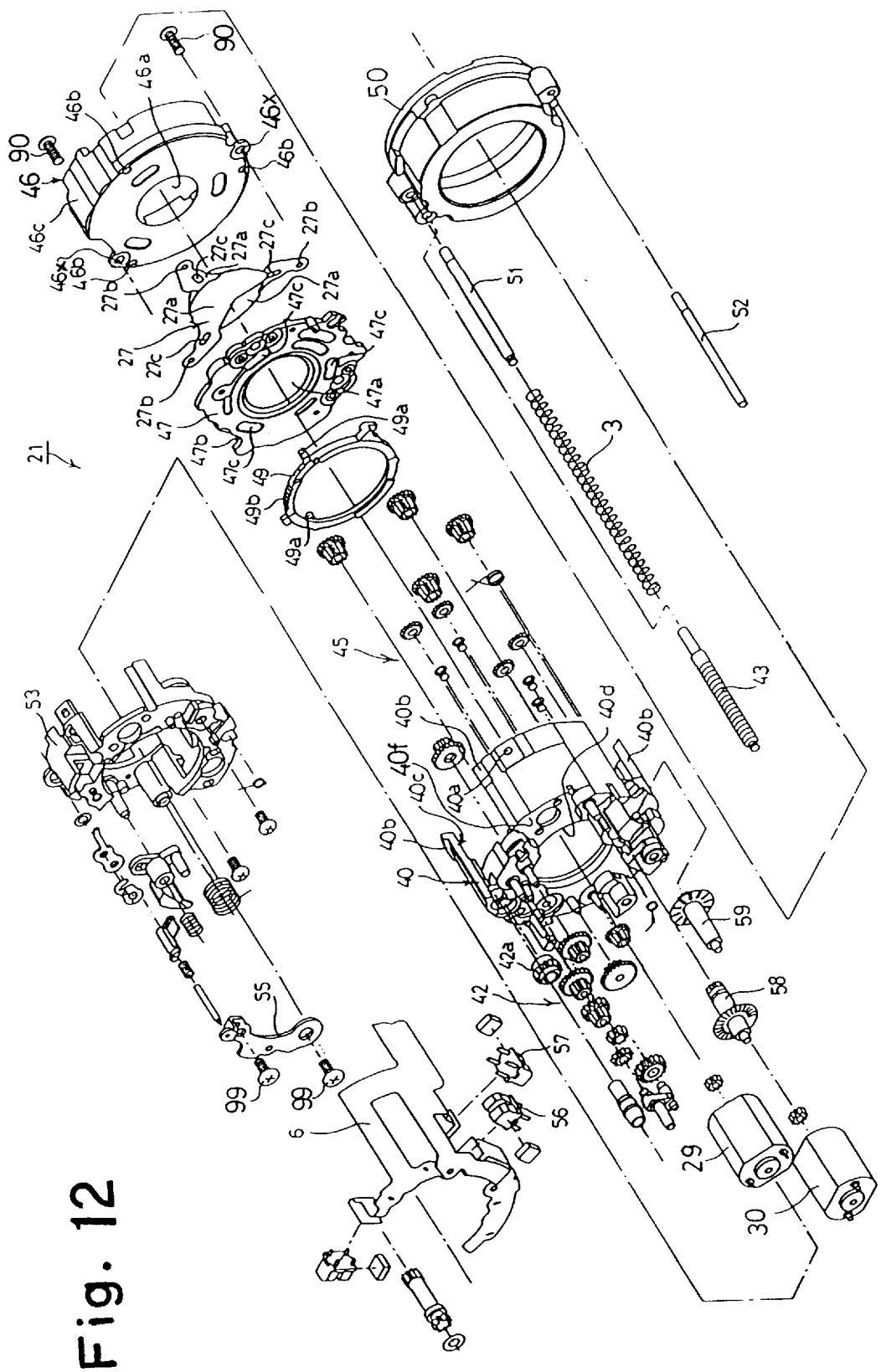
FIG. 12 is an exploded perspective view of a part of the zoom lens barrel.

At the front of the first moving barrel 20, a barrier apparatus 35 having barrier blades 48a and 48b is mounted. On an inner peripheral face of the first moving barrel 20 the AF/AE shutter unit 21 having the shutter 27, consisting of three shutter blades 27a, is engaged and fixed, as shown in FIG. 12. The AF/AE shutter unit 21 is provided with a plurality of fixing holes 40a formed at even angular intervals on the outer periphery of the shutter mounting stage 40. Only one of the fixing holes 40a appears in each of FIGS. 8 through 12.

The aforementioned plurality of follower pins 24, which engage with the inner lead grooves 19c, also serve as a device for fixing the AF/AE shutter unit 21 to the first moving barrel 20. The follower pins 24 are inserted in holes 20a, formed on the first moving barrel 20, and fixed in the fixing holes 40a. With this arrangement the AF/AE shutter unit 21 is secured to the first moving barrel 20 as shown in FIG. 11. In FIG. 11 the first moving barrel 20 is indicated by phantom lines. The follower pins 24 may be fixed by an adhesive, or the pins 24 may be formed as screws to be screwed into the fixing holes 40a.

As illustrated in FIGS. 5 and 12, the AF/AE shutter unit 21 is provided with the shutter mounting stage 40, a shutter blade supporting ring 46 fixed on the rear of the shutter mounting stage 40 so as to be located inside the shutter mounting stage 40, and the lens supporting barrel 50 supported in a state of being capable of movement relative to the shutter mounting stage 40. On the shutter mounting stage 40, the lens supporting barrel 34, the AE motor 29, and the rear lens group driving motor 30, are supported. The shutter mounting stage 40 is provided with an annular member 40f having a circular aperture 40d. The shutter mounting stage 40 is also provided with three legs 40b which project rearward from the annular member 40f. Three slits are defined between the three legs 40b. Two of the slits comprise the aforementioned linear guides 40c, which slidably engage with the respective pair of guide legs 22b of the linear guide member 22 so as to guide the movement of the linear guide member 22.

The shutter mounting stage 40 supports an AE gear train 45, which transmits a rotation of the AE motor 29 to the shutter 27, a lens driving gear train 42, which transmits rotation of the rear lens group driving motor 30 to a screw shaft 43, photointerrupters 56 and 57, connected to a flexible printed circuit board 6, and rotating disks 58 and 59. The rotating disks 58 and 59 have a plurality of radially formed slits provided in the circumferential direction. An encoder for detecting whether the rear lens group driving motor 30 is rotating and for detecting an amount of rotation of the rear lens group driving motor 30 consists of the photointerrupter 57 and the rotating disk 59. An AE motor encoder for detecting whether the AE motor 29 is rotating and for detecting an amount of rotation of the AE motor 29 consists of the photointerrupter 56 and the rotating disk 58.

The shutter 27, a supporting member 47 which pivotally supports the three shutter blades 27a of the shutter 27, and a circular driving member 49, which gives rotative power to the shutter blades 27a, are positioned between the shutter mounting stage 40 and the shutter blade supporting ring 46, secured to the shutter mounting stage 40. The circular driving member 49 is provided with three operating projections 49a at even angular intervals, which respectively engage each of the three shutter blades 27a.

As shown in FIG. 12, the shutter blade supporting ring 46 is provided at a front end thereof with a circular aperture 46a and with three supporting holes 46b positioned at even angular intervals around the circular aperture 46a. Two deflection restricting surfaces 46c are formed on the outer periphery of the shutter blade supporting ring 46. Each deflection restricting surface 46c is exposed outwardly from the corresponding linear guide 40c and slidably supports the inner peripheral face of the corresponding guide leg 22b.

The supporting member 47, positioned in front of the shutter blade supporting ring 46, is provided with a circular aperture 47a, aligned with the circular aperture 46a of the shutter blade supporting ring 46, and with three pivotal shafts 47b (only one of which is illustrated in FIG. 12) at respective positions opposite the three supporting holes 46b. Each shutter blade 27a is provided at one end thereof with a hole 27b into which the corresponding pivotal shaft 47b is inserted, so that each shutter blade 27a is rotatable about the corresponding pivotal shaft 47b. The major part of each shutter blade 27a, that extends normal to the optical axis O from the pivoted end, is formed as a light interception portion. All three light interception portions of the shutter blades 27a together prevent ambient light, which enters the front lens group L1, from entering the circular apertures 46a and 47a when the shutter blades 27a are closed. Each shutter blade 27a is further provided, between the hole 27b and the light interception portion thereof, with a slot 27c, through which the corresponding operating projection 49a is inserted. The supporting member 47 is fixed to the shutter blade supporting ring 46 in such a manner that each shaft 47b, which supports the corresponding shutter blade 27a, is engaged with the corresponding supporting hole 46b of the shutter blade supporting ring 46.

A gear portion 49b is formed on a part of the outer periphery of the circular driving member 49. The gear portion 49b meshes with one of the plurality of gears in the gear train 45 to receive the rotation from the gear train 45. The supporting member 47 is provided, at respective positions close to the three pivotal shafts 47b, with three arc grooves 47c each arched along a circumferential direction. The three operating projections 49a of the circular driving ring 49 engage with the slots 27c of the respective shutter blades 27a through the respective arc grooves 47c. The shutter blade supporting ring 46 is inserted from the rear of the shutter mounting stage 40, to support the circular driving ring 49, the supporting member 47 and the shutter 27, and is fixed on the shutter mounting stage 40 by set screws 90 respectively inserted through holes 46x provided on the shutter blade supporting ring 46.

Behind the shutter blade supporting ring 46, the lens supporting barrel 50, supported to be able to move relative to the shutter mounting stage 40 via guide shafts 51 and 52, is positioned. The shutter mounting stage 40 and the lens supporting barrel 50 are biased in opposite directions away from each other by a coil spring 3 fitted on the guide shaft 51, and therefore play between the shutter mounting stage 40 and the lens supporting barrel 50 is reduced. In addition, a driving gear 42a, provided as one of the gears in the gear train 42, is provided with a female thread hole (not shown) at the axial center thereof and is restricted to move in the axial direction. The screw shaft 43, one end of which is fixed to the lens supporting barrel 50, engages with the female thread hole. Accordingly, the driving gear 42a and the screw shaft 43 together constitute a feed screw mechanism. In such a manner, when the driving gear 42a rotates forwardly or reversely due to driving by the rear lens group driving motor 30, the screw shaft 43 respectively moves forwardly or rearwardly with respect to the driving gear 42a, and therefore the lens supporting barrel 50, which supports the rear lens group L2, moves relative to the front lens group L1.

A holding member 53 is fixed at the front of the shutter mounting stage 40. The holding member 53 holds the motors 29 and 30 between the holding member 53 and the shutter mounting stage 40. The holding member 53 has a metal holding plate 55 fixed at the front thereof by set screws 99. The motors 29, 30 and the photointerrupters 56, 57 are connected to the flexible printed circuit board 6. One end of the flexible printed circuit board 6 is fixed to the shutter mounting stage 40.

After the first, second and third moving barrels 20, 19 and 16, and the AF/AE shutter unit 21 and the like are assembled, the aperture plate 23 is fixed to the rear of the linear guide barrel 17, and an annular retaining member 33 is fixed at the front of the fixed lens barrel block 12.

In the zoom lens barrel 10 there is provided a cam mechanism for driving the second moving barrel 19 to move in the optical axis direction relative to the third moving barrel 16. The cam mechanism includes the linear guide barrel 17, the follower projections 19a of the second moving barrel 19, the follower pins 18, the linear guide grooves 16c of the third moving barrel 16, etc. In the present invention, the washer 82 is provided between each of the follower projections 19a and the corresponding ring member 18a, the detail of which is discussed hereinafter.

As shown in FIG. 1 or 2, each of the plurality of ring members 18a is provided with a circular recess 81b. A head 80a of the corresponding center fixing screw 18b is seated on the circular recess 81b. A central hole 81a is formed at the center of the bottom of the circular recess 81b, through which a threaded shaft 80b of the corresponding center fixing screw 18b is inserted. A screw hole 19d is formed on the second moving barrel 19 on each follower projection 19a. The thread shafts 80b are secured to the screw holes 19d, with the washers 82 being held between the ring members 18a and the follower projections 19a, respectively. Each lead slot 17b is provided, at a rear end thereof, with an end slot 17b' (FIG. 5) which extends in a circumferential direction of the linear guide barrel 17 and extends along and is adjacent to the retaining flange 17e.

A lead groove 17p (for the corresponding follower projection 19a to be inserted into the corresponding lead slot 17b during an assembly of the zoom lens barrel 10), is formed on an inner periphery of the rear end of the linear guide barrel 17 at the rear end of each lead slot 17b. During assembly of the zoom lens barrel 10, when the second moving barrel 19 is fitted in the linear guide barrel 17, the second moving barrel 19 is first inserted into the linear guide barrel 17 from the rear end thereof, and subsequently, the follower projections 19a are respectively inserted into the lead slots 17b through the lead grooves 17p. Thereafter, the ring members 18a are respectively fixed to the follower projections 19a by the center fixing screws 18b with the washers 82 being held between the ring members 18a and the follower projections 19a. Once the second moving barrel 19 and the linear guide barrel 17 are assembled in such a manner, each follower projection 19a is surely prevented from running off the corresponding lead slot 17b by the corresponding washer 82, improving strength of the cam mechanism while preventing excessive play from occurring in the cam mechanism.

Figure 19:
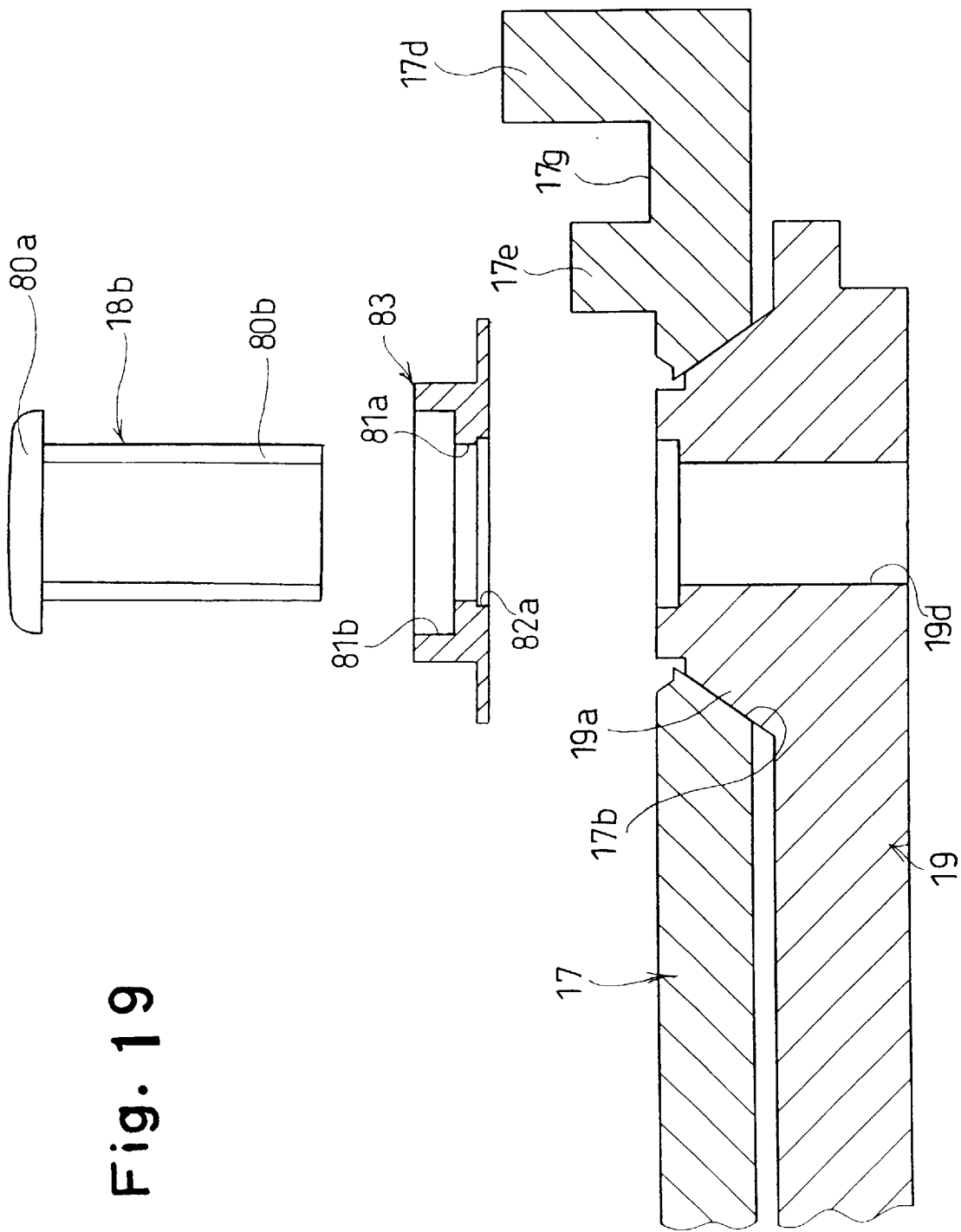
FIG. 19 is an exploded sectional view of a part of the zoom lens barrel, showing another embodiment wherein a washer and a ring member are integrally formed with each other.

FIG. 19 shows another embodiment of the cam mechanism in which a ring member 83 is used instead of the ring member 18a and the washer 82. The ring member 83 is equivalent to a integrally formed combination of the ring member 18a and the washer 82. According to this another embodiment, effects similar to those in the previous embodiment can be expected.

The ring members 18a respectively and slidably fit in the linear guide grooves 16c as noted above, while the follower projections 19a respectively and slidably fit in the lead slots 17b. Accordingly, when the third moving barrel 17 moves along the optical axis O while rotating about the optical axis O relative to the fixed lens barrel block 12, the second moving barrel 19 moves along the optical axis O relative to the third moving barrel 16 while rotating together with the third moving barrel 16 in the same rotational direction relative to the fixed lens barrel block 12.

The lead slots 17b are formed as linear grooves, each of which is oblique to both the optical axis direction and a circumferential direction of the linear guide barrel 17 by a predetermined angle (as noted above), so that the follower pins 18 are driven to move in the optical axis direction at a constant speed when the third moving barrel 16 is driven to rotate at a constant rotational speed. However, each lead slot 17b is regarded as a particular type of cam slot for moving the corresponding follower pin 18 in the optical axis direction at a constant speed when the third moving barrel 16 is driven to rotate at a constant rotational speed. Therefore, the lead slots 17b may be considered to be cam slots formed on the linear guide barrel 17.

The linear guide barrel 17 and the second moving barrel 19 are assembled in the following manner. Firstly, the second moving barrel 19 is inserted into the linear guide barrel 17 from the rear end thereof while each of the follower projections 19a is inserted into a corresponding one of the lead grooves 17p. Thereafter, one washer 82 is seated on the top of each follower projection 19a, which comes out of the corresponding lead slot 17b, and subsequently one ring member 18a is put on the washer 82 while the center fixing screw 18b is screwed in the screw hole 19d through the central hole 81a of the washer 82. Accordingly each ring member 18a is rotatably supported on the corresponding follower projection 19a about the corresponding center fixing screw 18b.

Figure 20:
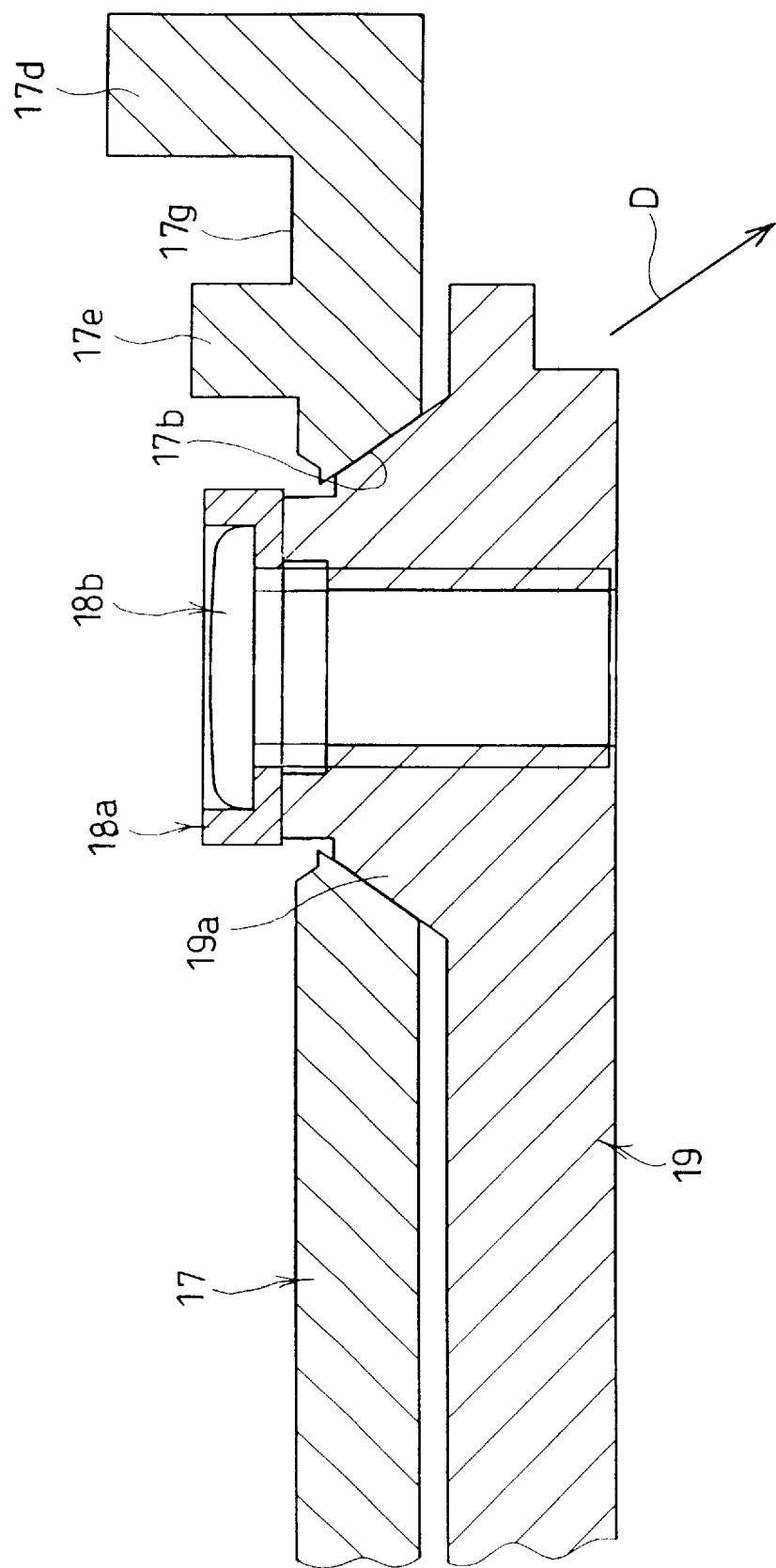
FIG. 20 is a sectional view of a part of the zoom lens barrel in the case where the washer is not provided between the ring member and a follower.

FIG. 20 shows a case where the washer 82 is not provided between the follower projection 19a and the corresponding ring member 18a, that is, an illustration of the problem. In the present embodiment of the zoom lens barrel 10 the lead of the lead slots 17b is large, i.e., the lead slots 17b are formed such that the second moving barrel 19 moves by a large distance along the optical axis O for an amount of rotation of the second moving barrel 19 relative to the linear guide barrel 17. Therefore, there is a possibility of each follower projection 19a running off the corresponding lead slot 17b if the second moving barrel 19 is forced to move relative to the linear guide barrel 17 along the optical axis O by a strong external force, e.g., if a strong impact is applied to the front end of the zoom lens barrel 10 in a direction of retraction thereof. In the present embodiment, since each lead slot 17b is formed to have a trapezoidal cross-sectional shape along a plane perpendicular to a longitudinal direction thereof while each follower projection 19a is formed to have a corresponding shape to be firmly fitted in the corresponding lead slot 17b as mentioned above, there is a higher possibility of each follower projection 19a running off the corresponding lead slot 17b if the second moving barrel 19 is forced to move relative to the linear guide barrel 17 along the optical axis O by a strong external force. An arrow D shown in FIG. 20 shows a direction of the follower projection 19a running off the corresponding lead slot 17b in the case where the follower projection 19a runs off the lead slot 17b.

However, in the present embodiment of the zoom lens barrel 10, since the washer 82, which has a diameter larger than the width W of the corresponding lead slot 17b, is held between each follower projection 19a and the corresponding ring member 18a, each follower projection 19a is surely prevented from running off the corresponding lead slot 17b by the corresponding washer 82, which improves the strength of the cam mechanism while preventing excessive play from occurring in the cam mechanism.

Each of the lead slots 17b may be formed merely as a lead slot whose side surfaces (guide surfaces) are parallel to each other while each of the follower projections 19a may be formed merely as a follower projection having a cylindrical shape to be fitted to the corresponding lead slot. With such modifications, similar effects can be expected as long as the washer 82 is held between each follower projection 19a and the corresponding ring member 18a.

In the above-described embodiment of the zoom lens barrel 10, although the zoom lens optical system consists of two movable lens groups, namely the front lens group L1 and the rear lens group L2, it should be understood that the present invention is not limited to the present embodiment disclosed above, but the present invention may also be applied to another type of zoom lens optical system including one or more fixed lens group.

In addition, in the above embodiment, the rear lens group L1 is provided as a component of the AF/AE shutter unit 21, and the AE motor 29 and the rear lens group driving motor 30 are mounted to the AF/AE shutter unit 21. With such a structure, the structure for supporting the front and rear lens groups L1 and L2 and the structure for driving the rear lens group L2 are both simplified. Instead of adopting such a structure, the zoom lens barrel 10 may also be realized in such a manner by making the rear lens group L2 a member separate from the AF/AE shutter unit 21, which is provided with the shutter mounting stage 40, the circular driving member 49, the supporting member 47, the shutter blades 27, the shutter blade supporting ring 46 and the like, and that the rear lens group L2 is supported by any supporting member other than the AF/AE shutter unit 21.

In the zoom lens camera of the present embodiment, the operation by rotation of the whole optical unit driving motor 25 and the rear lens group driving motor 30 will now be described with reference to FIGS. 14, 15, 16 and 17.

Figure 14:
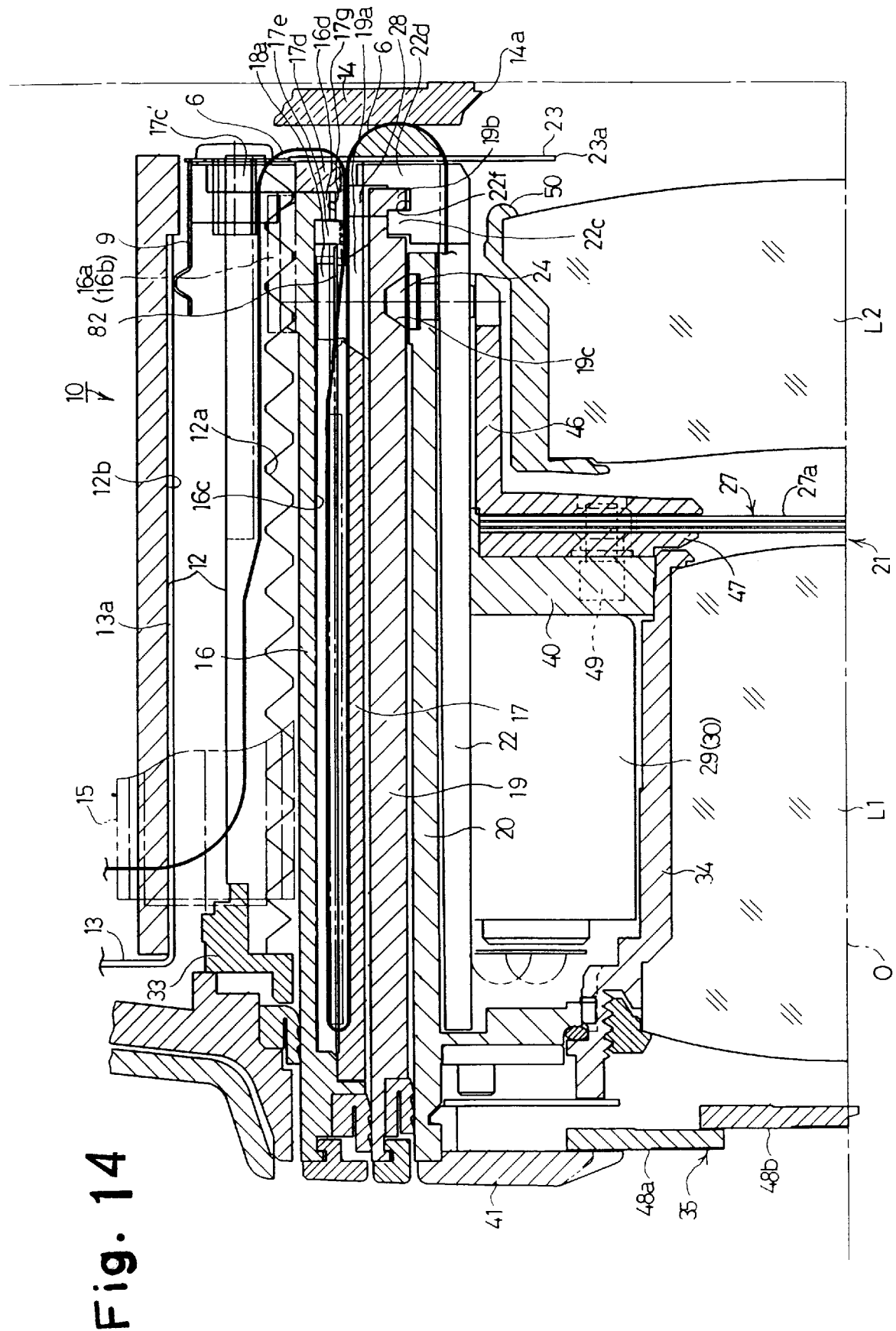
FIG. 14 is a sectional view of an upper part of the zoom lens barrel in a housed state.
Figure 16:
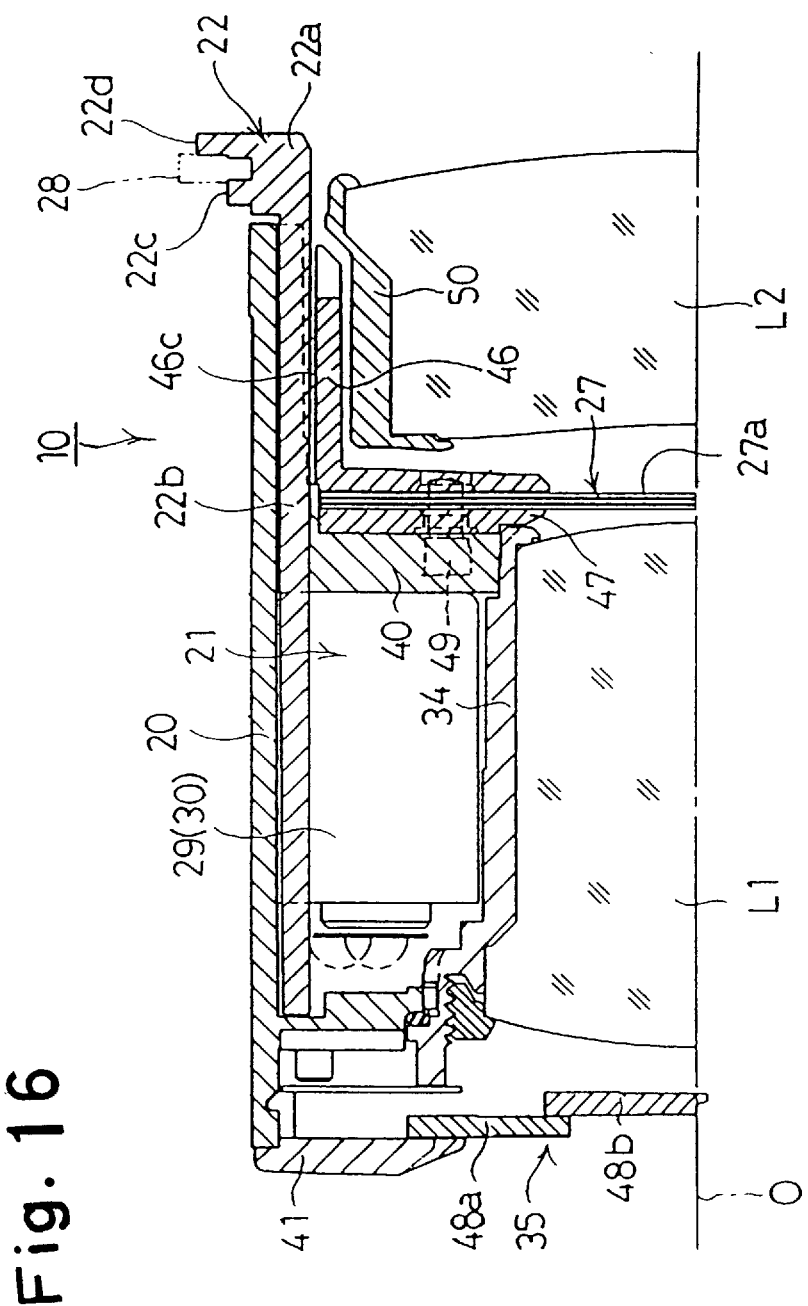
FIG. 16 is a sectional view of an upper part of the zoom lens barrel, illustrating essential elements in the housed state.

As shown in FIG. 14 or 16, when the zoom lens barrel 10 is at the most retracted (withdrawn) position, (i.e., the lens-housed condition), when the power switch is turned ON, the whole optical unit driving motor 25 is driven to rotate its drive shaft in the forward rotational direction by a small amount. This rotation of the motor 25 is transmitted to the driving pinion 15 through a gear train 26, which is supported by a supporting member 32 formed integral with the fixed lens barrel block 12, to thereby rotate the third moving barrel 16 in one predetermined rotational direction to advance forwardly along the optical axis O. Therefore, the second moving barrel 19 and the first moving barrel 20 are each advanced by a small amount in the optical axis direction, along with the third moving barrel 16. Consequently, the camera is in a state capable of photographing, with the zoom lens positioned at the widest position, i.e., the wide end. At this stage, because the amount of movement of the linear guide barrel 17 with respect to the fixed lens barrel block 12 is detected through the relative slide between the code plate 13a and the contacting terminal 9, the focal length of the zoom lens barrel 10, (i.e., the front and rear lens groups L1 and L2), is detected.

In the photographable state as above described, when the aforementioned zoom operating lever is manually moved towards a "tele" side, or the "tele" zoom button is manually depressed to be turned ON, the whole optical unit driving motor 25 is driven to rotate its drive shaft in the forward rotational direction through the whole optical unit driving motor controller 60 so that the third moving barrel 16 rotates in the rotational direction to advance along the optical axis O via the driving pinion 15 and the outer peripheral gear 16b. Therefore, the third moving barrel 16 is advanced from the fixed lens barrel block 12 according to the relationship between the female helicoid 12a and the male helicoid 16a. At the same time, the linear guide barrel 17 moves forwardly in the optical axis direction together with the third moving barrel 16, without relative rotation to the fixed lens barrel block 12, according to the relationship between the engaging projections 17c and the linear guide grooves 12b. At this time, the simultaneous engagement of the follower pins 18 with the respective lead slots 17b and linear guide grooves 16c causes the second moving barrel 19 to move forwardly relative to the third moving barrel 16 in the optical axis direction, while rotating together with the third moving barrel 16 in the same rotational direction relative to the fixed lens barrel block 12. The first moving barrel 20 moves forwardly from the second moving barrel 19 in the optical axis direction, together with the AF/AE shutter unit 21, without relative rotation to the fixed lens barrel block 12, due to the above-noted structures in which the first moving barrel 20 is guided linearly by the linear guide member 22 and in which the follower pins 24 are guided by the lead grooves 19c. During such movements, because the moving position of the linear guide barrel 17 with respect to the fixed lens barrel block 12 is detected through the relative slide between the code plate 13a and the contacting terminal 9, the focal length set by the zoom operation device 62 is detected.

Conversely, when the zoom operating lever is manually moved towards a "wide" side, or the "wide" zoom button is manually depressed to be turned ON, the whole optical unit driving motor 25 is driven to rotate its drive shaft in the reverse rotational direction through the whole optical unit driving motor controller 60 so that the third moving barrel 16 rotates in the rotational direction to retract into the fixed lens barrel block 12 together with the linear guide barrel 17. At the same time, the second moving barrel 19 is retracted into the third moving barrel 16, while rotating in the same direction as that of the third moving barrel 16, and the first moving barrel 20 is retracted into the rotating second moving barrel 19 together with the AF/AE shutter unit 21. During the above retraction driving, like the case of advancing driving as above described, the rear lens group driving motor 30 is not driven.

Figure 15:
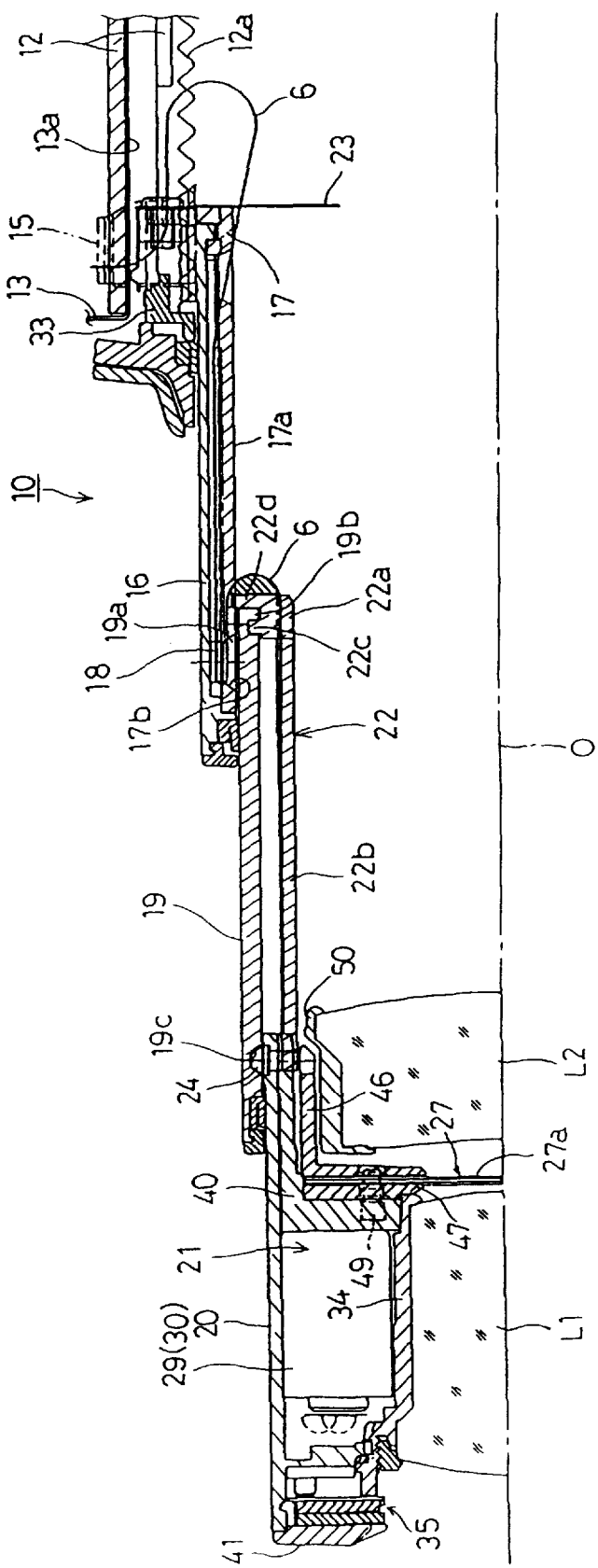
FIG. 15 is a sectional view of an upper part of the zoom lens barrel in a maximum extended state.

While the zoom lens barrel 10 is driven during the zooming operation, since the rear lens group driving motor 30 is not driven, the front lens group L1 and the rear lens group L2 move as a whole, maintaining a constant distance between each other, as shown in FIG. 15 or 17. The focal length input via the zoom code plate 13a and the contacting terminal 9 is indicated on an LCD panel (not shown) provided on the camera body.

At any focal length set by the zoom operating device 62, when the release button is depressed by a half-step, the object distance measuring apparatus 64 is actuated to measure a current subject distance. At the same time the photometering apparatus 65 is actuated to measure a current subject brightness. Thereafter, when the release button is fully depressed, the whole optical unit driving motor 25 and the rear lens group driving motor 30 are each driven by respective amounts according to the focal length information set in advance and the subject distance information obtained from the object distance measuring apparatus 64, so that the front and rear lens groups L1 and L2 are respectively moved to specified positions to obtain a specified focal length to thereby bring the subject into focus. Immediately after the subject is brought into focus, via the AE motor controller 66, the AE motor 29 is driven to rotate the circular driving member 49 by an amount corresponding to the subject brightness information obtained from the photometering apparatus 65 so that the shutter 27 is driven to open the shutter blades 27a by a specified amount which satisfies the required exposure. Immediately after such a shutter release operation, in which the three shutter blades 27a are opened and subsequently closed, is completed, the whole optical unit driving motor 25 and the rear lens group driving motor 30 are both driven to move the front lens group L1 and the rear lens group L2 to the respective initial positions at which they were at prior to a shutter release.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel comprising:
   a cam ring having at least one cam slot;
   a follower barrel on which said cam ring is slidably fitted;
   at least one follower projection formed on said follower barrel to be respectively fitted in said at least one cam slot;
   at least one radially projecting member respectively provided on said at least one follower projection to project outwardly from an outer periphery of said cam ring in a radial direction;
   at least one washer respectively provided between said at least one follower projection and said at least one radially projecting member, said at least one washer being formed to have a diameter larger than a width of a corresponding said at least one cam slot so that at least a rim of said at least one washer contacts said outer periphery of said cam ring.

2. The lens barrel according to claim 1, wherein said at least one follower projection is integrally formed on said follower barrel.

3. The lens barrel according to claim 1, wherein said at least one radially projecting member is fixed to said at least one follower projection after said cam ring has been fitted on said follower barrel, and said at least one follower projection being respectively fitted in said at least one cam slot.

4. The lens barrel according to claim 1, wherein each said at least one radially projecting member is a ring member which is fixed to a corresponding said at least one follower projection through a set screw screwed in a corresponding said at least one follower projection.

5. The lens barrel according to claim 4, wherein said ring member is fixed to said corresponding at least one follower projection to be rotatable about said set screw.

6. The lens barrel according to claim 1, wherein said at least one washer is integrally formed with said at least one radially projecting member, respectively.

7. The lens barrel according to claim 1, wherein each said at least one cam slot is formed such that a cross-section along a plane perpendicular to a longitudinal direction thereof tapers in a direction away from an optical axis of said lens barrel, and
   wherein each said at least one follower projection is formed to have a trapezoidal cross-sectional shape projecting away from said optical axis in a radial direction so as to be firmly fitted in said at least one cam slots, respectively.

8. The lens barrel according to claim 1, further comprising a guide barrel fitted on said cam ring; and
   at least one linear guide groove formed on an inner periphery of said guide barrel to extend parallel to an optical axis of said lens barrel, said at least one radially projecting member being respectively fitted in said at least one linear guide groove.

9. The lens barrel according to claim 8, wherein said guide barrel is fitted on said cam ring such that said guide barrel is rotatable about said optical axis relative to said cam ring and immovable in a direction of said optical axis relative to said cam ring.

10. The lens barrel according to claim 8, further comprising:
    a stationary barrel in which said guide barrel is positioned, a male helicoid being formed on an inner periphery of said stationary barrel; and a female helicoid formed on a rear end of an outer periphery of said guide barrel to be engaged with said male helicoid, so that said guide barrel moves along said optical axis when driven to rotate about said optical axis relative to said stationary barrel.

11. A camera provided with said lens barrel according to claim 10, said camera comprising a stationary block on which said stationary barrel is integrally formed.

12. The lens barrel according to claim 1, wherein said at least one cam slot extends at an oblique angle to a direction of said optical axis.

13. The lens barrel according to claim 1, wherein said follower barrel is guided along an optical axis of said lens barrel without rotating about said optical axis relative to a stationary block of said lens barrel.

14. A lens barrel comprising:
   a cam ring having a plurality of cam slots;
   a follower barrel on which said cam ring is slidably fitted;
   a plurality of follower projections formed on said follower barrel to be respectively fitted in said plurality of cam slots;
   a plurality of radially projecting members respectively provided on said plurality of follower projections to each project outwardly from an outer periphery of said cam ring in a radial direction;
   a plurality of washers respectively held between said plurality of follower projections and said plurality of radially projecting members, each of said plurality of washers being formed to have a diameter larger than a width of a corresponding one of said plurality of cam slots so that at least a rim of said each of said plurality of washers contacts said outer periphery of said cam ring.

15. A telescoping zoom lens having first, second and third barrels concentrically arranged in this order from an optical axis, said telescoping zoom lens comprising:
   a plurality of cam slots formed on said second barrel and extending parallel to one another at an oblique angle with respect to a direction of said optical axis;
   a plurality of guide grooves formed on an inner periphery of said third barrel;
   a plurality of followers formed on an outer periphery of said first barrel to be respectively engaged with said plurality of guide grooves through said plurality of cam slots, wherein each of said plurality of followers comprises: a follower projection formed on said outer periphery of said first barrel to be fitted in a corresponding one of said plurality of cam slots; a radially projecting member provided on said projection to be fitted in a corresponding one of said plurality of guide grooves; and
   a washer held between said projection and said radially projecting member, said washer being formed to have a diameter larger than a width of a corresponding one of said plurality of cam slots so that at least a rim of said each washer contacts an outer periphery of said second barrel.

16. A cam mechanism used for a photographic lens which includes a moving barrel and a cam ring fitted on said moving barrel such that said moving barrel is movable relative to said cam ring along an optical axis of said photographic lens, said cam mechanism comprising:
   at least one cam slot formed on said cam ring extending at an oblique angle with respect to a direction of said optical axis;
   at least one follower projection formed on an outer periphery of said moving barrel;
   at least one radially projecting member respectively provided on said at least one follower projection; and
   at least one washer respectively provided between said at least one follower projection and said at least one radially projecting member, said at least one washer being formed to have a diameter larger than a width of a corresponding said at least one cam slot so that at least a rim of said at least one washer contacts said outer periphery of said cam ring.

17. The cam mechanism according to claim 16, wherein said photographic lens is a zoom lens.

18. The cam mechanism according to claim 16, wherein said cam ring is guided along said optical axis without rotating about said optical axis relative to a stationary block of said photographic lens.

* * * * *

UNITED STATES PATENT AND TRADEMARK OFFICE
CERTIFICATE OF CORRECTION

PATENT NO. : 5,886,836
DATED : March 23, 1999
INVENTOR(S) : T. SASAKI et al.

It is certified that error appears in the above-identified patent and that said Letters Patent is hereby corrected as shown below:

At column 18, line 15 (claim 15, line 23) of the printed patent, delete "each".

Signed and Sealed this

Twenty-eighth Day of March, 2000

*Attest:*

Q. TODD DICKINSON

*Attesting Officer*     *Commissioner of Patents and Trademarks*